United States Patent
Yan et al.

(10) Patent No.: US 12,521,673 B2
(45) Date of Patent: Jan. 13, 2026

(54) ELECTROCHEMICALLY DRIVEN CARBON DIOXIDE SEPARATOR

(71) Applicant: University of Delaware, Newark, DE (US)

(72) Inventors: Yushan Yan, Hockessin, DE (US); Stephanie Matz, Elkton, MD (US); David Yan, Hockessin, DE (US); Rohan Razdan, Newark, DE (US); Brian Setzler, Newark, DE (US)

(73) Assignee: University of Delaware, Newark, DE (US)

( * ) Notice: Subject to any disclaimer, the term of this patent is extended or adjusted under 35 U.S.C. 154(b) by 652 days.

(21) Appl. No.: 17/926,229

(22) PCT Filed: May 20, 2021

(86) PCT No.: PCT/US2021/033489
§ 371 (c)(1),
(2) Date: Nov. 18, 2022

(87) PCT Pub. No.: WO2021/236979
PCT Pub. Date: Nov. 25, 2021

(65) Prior Publication Data
US 2023/0191318 A1    Jun. 22, 2023

Related U.S. Application Data

(60) Provisional application No. 63/027,760, filed on May 20, 2020.

(51) Int. Cl.
*B01D 53/32* (2006.01)
*H01M 8/0662* (2016.01)
*H01M 12/06* (2006.01)

(52) U.S. Cl.
CPC ........ *B01D 53/326* (2013.01); *H01M 8/0681* (2013.01); *H01M 12/06* (2013.01);
(Continued)

(58) Field of Classification Search
CPC ........ B01D 53/326; B01D 2255/20753; B01D 2255/806; B01D 2257/504;
(Continued)

(56) References Cited

U.S. PATENT DOCUMENTS

| 4,107,395 A | 8/1978 | Van Ommering et al. |
| 5,219,673 A | 6/1993 | Kaun |

(Continued)

FOREIGN PATENT DOCUMENTS

| CA | 2950294 A1 | 12/2015 |
| CL | 199700945 A1 | 5/1997 |

(Continued)

OTHER PUBLICATIONS

"Carbonate Dynamics and Opportunities with Low Temperature, Anion Exchange Membrane-Based Electrochemical Carbon Dioxide Separators" by Rigdon et al., J. Electrochem. En. Conv. Stor., vol. 14, pp. 020701-1 to 020701-8 (May 2017). (Year: 2017).*

(Continued)

*Primary Examiner* — Bryan D. Ripa
(74) *Attorney, Agent, or Firm* — Lewis Rice LLC

(57) ABSTRACT

Electrochemical devices including electrochemically-driven carbon dioxide separators are disclosed, the devices including electrodes comprised of an anion exchange polymer and a charge storage compound such as nickel hydroxide and a membrane comprising an anion exchange polymer, the membrane having a channel for inflow of a carbon dioxide-containing gas within the membrane.

28 Claims, 12 Drawing Sheets

(52) U.S. Cl.
CPC .............. *B01D 2255/20753* (2013.01); *B01D 2255/806* (2013.01); *B01D 2257/504* (2013.01); *B01D 2258/0283* (2013.01); *B01D 2258/06* (2013.01)

(58) Field of Classification Search
CPC ........ B01D 2258/0283; B01D 2258/06; B01D 53/62; H01M 8/0681; H01M 12/06; Y02C 20/40
See application file for complete search history.

(56) References Cited

U.S. PATENT DOCUMENTS

| | | | |
|---|---|---|---|
| 9,368,819 | B1 | 6/2016 | Gottesfeld |
| 9,370,773 | B2 | 6/2016 | Masel et al. |
| 10,173,178 | B1 | 1/2019 | Deshpande et al. |
| 10,811,711 | B2* | 10/2020 | Yan ..................... H01M 8/0618 |
| 11,757,120 | B2 | 9/2023 | Yan et al. |
| 2001/0033959 | A1 | 10/2001 | Ovshinsky et al. |
| 2001/0041281 | A1 | 11/2001 | Wilkinson et al. |
| 2005/0164072 | A1 | 7/2005 | Yan et al. |
| 2006/0046135 | A1 | 3/2006 | Huang |
| 2009/0159456 | A1 | 6/2009 | Littau |
| 2009/0186244 | A1 | 7/2009 | Mayer |
| 2010/0205856 | A1 | 8/2010 | Kubic et al. |
| 2010/0230293 | A1 | 9/2010 | Gilliam et al. |
| 2011/0027664 | A1 | 2/2011 | Burchardt et al. |
| 2011/0027884 | A1 | 2/2011 | Musselmann et al. |
| 2011/0195323 | A1 | 8/2011 | Inoue et al. |
| 2012/0193222 | A1 | 8/2012 | Mustain, Jr. et al. |
| 2013/0052549 | A1 | 2/2013 | Mizuhata et al. |
| 2013/0122382 | A1 | 5/2013 | Mizuhata et al. |
| 2015/0182917 | A1 | 7/2015 | Hosoya et al. |
| 2016/0351930 | A1 | 12/2016 | Jahnke et al. |
| 2017/0207464 | A1 | 7/2017 | Gyenge et al. |
| 2017/0314142 | A1 | 11/2017 | Leonard et al. |
| 2018/0111083 | A1 | 4/2018 | Masel |
| 2018/0248198 | A1 | 8/2018 | Yadav |
| 2018/0326364 | A1 | 11/2018 | Kim et al. |
| 2019/0051907 | A1 | 2/2019 | Cui et al. |
| 2019/0151796 | A1 | 5/2019 | Bahar et al. |
| 2021/0138398 | A1 | 5/2021 | Reid |
| 2022/0072471 | A1 | 3/2022 | de Neve et al. |
| 2022/0118402 | A1* | 4/2022 | Bahar ................ B01D 53/1425 |

FOREIGN PATENT DOCUMENTS

| | | |
|---|---|---|
| EP | 2727882 A1 | 7/2014 |
| EP | 2740710 A1 | 11/2014 |
| JP | 2017228351 A | 12/2017 |
| WO | 2015048623 A1 | 4/2015 |
| WO | 2017172824 A1 | 10/2017 |

OTHER PUBLICATIONS

International Preliminary Report on Patentability, International Patent Application No. PCT/US2021/033489, dated Nov. 17, 2022, 6 Pages.
Ghezel-Ayagh, Hossein et al., Carbonate Fuel Cell Application for Synergistic Power Generation and Carbon Dioxide Capture, ECS Transactions, 26(1) 391-398 (2010).
Ghezel Ayagh, Hossein et al., Energy Sustainability through Combined Electric Power Production and Carbon-Dioxide Separation (CEPACS) Systems, ECS Transactions, 42(1) 23-29 (2012).
Landon, James et al., Electrochemical Concentration of Carbon Dioxide from an Oxygen/Carbon Dioxide Containing Gas Stream, Journal of the Electrochemical Society, 157(8) B1149-B1153 (2010).
Li, K. et al., Removal of Carbon Dioxide from Breathing Gas Mixtures Using an Electrochemical Membrane Cell, Separation Science and Technology, 28(4), pp. 1085-1090 (1993).
Pennline, Henry W. et al., Separation of CO2 from flue gas using electrochemical cells, Fuel 89 (2010) pp. 1307-1314.
Rigdon, William A. et al., Carbonate Dynamics and Opportunities with Low Temperature, Anion Exchange Membrane-Based Electrochemical Carbon Dioxide Separators, Journal of Electrochemical Energy Conversion and Storage (May 2017), vol. 14, pp. 020701-1-020701-8.
Walke, Luther et al., Recovery of CO2 from flue gas using an electrochemical membrane, Gas Separation & Purification (1988) vol. 2, pp. 72-76.
Winnick, J., Electrochemical membrane gas separation, Chemical Engineering Progress, vol. 86 (1990), pp. 41-46.
Winnick, J., Electrochemical Separation of Gases, Advances in Electrochemical Science and Engineering (1990), vol. 1, pp. 205-248.
International Search Report and Written Opinion, International Patent Application PCT/US2019/62499, dated Feb. 6, 2020, 14 Pages.
Ponce-Gonzalez, Julia et al., "High Performance aliphatic-heterocyclic benzyl-quaternary ammonium radiation-grafted anion exchange membranes", Energy & Environmental Science, Jan. 1, 2016, pp. 3724-3735, vol. 9 No. 12.
Zeng, L et al., "A high-performance sandwiched-porous polybenzumidazole membrane with enhanced alkaline retention for anion exchange membrane fuel cells", Energy & Environmental Science, Jan. 1, 2015, pp. 2768-2774, vol. 8 No. 9.
Varcoe, John R et al., "Anion-exchange membranes in electrochemical energy systems", Energy & Environmental Science, Aug. 4, 2014, pp. 3135-3191, vol. 7 No. 10.
Yanagi, H et al., "Anion Exchange Membrane and Ionomer for Alkaline Membrane Fuel Cells (AMFCs)", ECS Transactions, Electrochemical Society, Jan. 1, 2008, pp. 257-262, vol. 16 No. 2.
Danks, Timothy N. et al., "Comparison of PVDF-and FEP-based radiation-grafted alkaline anion-exchange membranes for use in low temperature portable DMFCs", Journal of Materials Chemistry, Sep. 26, 2002, pp. 3371-3373, vol. 12 No. 12.
Luo, Xiaoyan et al., "Structure-transport relationships of poly (aryl-piperidinium) anion-exchange memberanes: Eeffect of anions and Hydration", Journal of Membrane Science Nov. 19, 2019, vol. 588.
Mandal, Mrinmay et al., "Highly Conductive Anion-Exchange Membranes Based on Cross-Linked Poly) horbomene): Vinyl Addition Polymerization", ACS Applied Energy Materials, Mar. 20, 2019, pp. 2447-2457, vol. 2 No. 4.
Fan, Jianto et al., "Poly (bis-arylimidazoliums) possessing high hydroxide ion exchange capacity and high alkaline stability", Nature Communications, May 24, 2019, vol. 10 No. 1.
Wang, Teng, et al., "High-Performance Hydroxide Exchange Membrane Fuel Cells through Optimization of Relative Humidity, Backpressure and Catalyst Selection", Journal of the Electrochemical Society Jan. 1, 2019, vol. 166, No. 7.
Wang, Junhua et al., "Poly (aryl piperidinium) membranes and ionomers for hydroxide exchange" Nature Energy, Apr. 8, 2019, pp. 392-398, vol. 4, No. 5.
Supplementary European Search Report and Opinion for Application No. 19886702.0, issued Jul. 7, 2022, 36 Pages.
International Search Report and Written Opinion issued for PCT/US2021/33489 dated Aug. 16, 2021, 9 pages.
International Preliminary Report on Patentability issued for PCT/US19/62499 dated May 25, 2021, 11 Pages.
Extended European Search Report in EP21808620.5, mailed Jun. 6, 2024, 9 pages.
Danks et al., "Comparison of PVDF- and FEP-based radiation-grafted alkaline anion-exchange membranes for use in low temperature portable DMFCs," Journal of Materials Chemistry, 2002, vol. 12, pp. 3371-3373.
Extended European Search Report in EP19886702.0, mailed Jul. 7, 2022, 34 pages.
Fan et al., "Poly (bis-arylimidazoliums) possessing high hydroxide ion exchange capacity and high alkaline stability," Nature Communications, 2019, vol. 10, pp. 1-10.
Ghezel-Ayagh et al., "Carbonate Fuel Cell Application for Synergistic Power Generation and Carbon Dioxide Capture," ECS Transactions, 2010, vol. 26, No. 1, pp. 391-398.

(56) References Cited

OTHER PUBLICATIONS

Ghezel-Ayagh et al., "Energy Sustainability through Combined Electric Power Production and Carbon-Dioxide Separation (CEPACS) Systems," ECS Transactions, 2012, vol. 42, No. 1, pp. 23-29.
International Search Report and Written Opinion in PCT/US2019/062499, mailed Feb. 6, 2020, 14 pages.
International Search Report and Written Opinion in PCT/US2021/033489, mailed Aug. 16, 2021, 8 pages.
Landon et al., "Electrochemical Concentration of Carbon Dioxide from an Oxygen/Carbon Dioxide Containing Gas Stream," Journal of the Electrochemical Society, 2010, vol. 157, No. 8, pp. B1149-B1153.
Li et al., "Removal of Carbon Dioxide from Breathing Gas Mixtures Using an Electrochemical Membrane Cell," Separation Science and Technology, 1993, vol. 28, No. 4, pp. 1085-1090.
Luo et al., "Structure-transport relationships of poly (aryl-piperidinium) anion-exchange membranes: Eeffect of anions and Hydration," Journal of Membrane Science, 2020, vol. 598, pp. 1-11.
Mandal et al., "Highly Conductive Anion-Exchange Membranes Based on Cross-Linked Poly(norbornene): Vinyl Addition Polymerization," ACS Applied Energy Materials, 2019, vol. 2, pp. 2447-2457.
Pennline et al., "Separation of $CO_2$ from flue gas using electrochemical cells," Fuel, 2010, vol. 89, pp. 1307-1314.
Ponce-Gonzalez et al., "High performance aliphatic-heterocyclic benzyl-quaternary ammonium radiation-grafted anion-exchange membranes," Energy & Environmental Science, 2016, vol. 9, pp. 3724-3735.
Rigdon et al., "Carbonate Dynamics and Opportunities with Low Temperature, Anion Exchange Membrane-Based Electrochemical Carbon Dioxide Separators," Journal of Electrochemical Energy Conversion and Storage, May 2017, vol. 14, pp. 020701-1-020701-8.
Varcoe et al., "Anion-exchange membranes in electrochemical energy systems," Energy & EnvironmentalScience, 2014, vol. 7, pp. 3135-3191.
Walke et al., "Recovery of $CO_2$ from flue gas using an electrochemical membrane," Gas Separation & Purification, Jun. 1988, pp. 72-76.
Wang et al., "High-Performance Hydroxide Exchange Membrane Fuel Cells through Optimization of Relative Humidity, Backpressure and Catalyst Selection," Journal of the Electrochemical Society, 2019, vol. 166, No. 7, pp. F3305-F3310.
Wang et al., "Poly(aryl piperidinium) membranes and ionomers for hydroxide exchange," Nature Energy, May 2019, vol. 4, pp. 392-398.
Winnick, J., "Electrochemical Membrane Gas Separation," Chemical Engineering Progress, Jan. 1990, vol. 86, pp. 41-46.
Yanagi et al., "Anion Exchange Membrane and Ionomer for Alkaline Membrane Fuel Cells (AMFCs)," ECS Transactions, 2008, vol. 16, No. 2, pp. 257-262.
Zeng et al., "A high-performance sandwiched-porous polybenzumidazole membrane with enhanced alkaline detention for anion exchange membrane fuel cells," Energy & Environmental Science, 2015, vol. 8, pp. 2768-2774.
International Preliminary Report on Patentability in PCT/US2019/062499, mailed May 25, 2021, 11 pages.
International Preliminary Report on Patentability in PCT/US2021/033489, mailed Nov. 17, 2022, 6 pages.
Japanese Office Action in 2012-25601, mailed Dec. 1, 2023, 25 pages.

\* cited by examiner

ELECTROCHEMICALLY DRIVEN CARBON DIOXIDE SEPARATOR

CROSS REFERENCE TO RELATED APPLICATIONS

This application is a § 371 U.S. National Phase of International Application Serial No. PCT/US2021/033489 filed May 20, 2021, which claims benefit of U.S. Provisional Application No. 63/027,760 filed May 20, 2020, the entire disclosure of which is herein incorporated by reference.

STATEMENT REGARDING FEDERALLY SPONSORED RESEARCH OR DEVELOPMENT

This invention was made with Government support under grant DE-AR0001034 awarded by Advanced Research Projects Agency-Energy (ARPA-E), U.S. Department of Energy. The Government has certain rights in the invention.

FIELD OF THE INVENTION

Electrochemical devices, particularly electrochemically driven carbon dioxide separators (EDCS) also known as external-current electrochemical pumps (eECP) are disclosed. The EDCS can be used in methods for separating carbon dioxide from air.

BACKGROUND OF THE INVENTION

Emissions of carbon dioxide ($CO_2$) from combustion of fossil fuels and other sources are causing a buildup of $CO_2$ in the atmosphere, leading to climate change with costly consequences for all societies. While carbon-neutral replacements are viable for many uses of fossil fuels, some applications have few economically viable alternatives. For these applications, the continued use of carbon-based fuels can be offset by capturing $CO_2$ and either sequestering the $CO_2$ underground, or using the $CO_2$ with renewable energy to make the fuels in a carbon-neutral manner. Large-scale point sources of $CO_2$ emissions can be captured from relatively concentrated streams. However, for distributed uses of fossil fuel, such as in transportation and space heating, $CO_2$ emissions cannot be captured at the point of use.

Direct air capture (DAC) of $CO_2$ from the atmosphere can be used to offset distributed sources of $CO_2$ emissions. In addition, DAC has the potential to remove previous $CO_2$ emissions from the atmosphere, in a case where society has overshot a tolerable level of $CO_2$ in the atmosphere. Existing technologies for DAC are primarily focused on thermal and pressure-based separations using sorbents or solvents.

An EDCS uses an electrochemically generated flux of hydroxide anions to separate $CO_2$ from a gas mixture. $CO_2$ reacts with strong bases like hydroxide anions to form carbonate and bicarbonate anions.

$$CO_2 + OH^- \rightleftharpoons HCO_3^- \quad [1]$$

$$HCO_3^- + OH^- \rightleftharpoons CO_3^{2-} + H_2O \quad [2]$$

In an EDCS, hydroxide anions are generated at the cathode and react with $CO_2$ from a mixed gas stream. The resulting carbonate and bicarbonate anions are electrochemically driven to the anode, where consumption of hydroxide causes a drop in pH. The drop in pH shifts the equilibrium of equations 1 and 2 to favor gaseous $CO_2$, allowing $CO_2$ to be concentrated to a much higher partial pressure than in the mixed gas stream from which it was removed.

In principle, any pair of electrochemical reactions that produce and consume hydroxide anions may be used for the cathode and anode of the EDCS. Previous examples of EDCS are based on the reactions of hydrogen, oxygen, and water, namely oxygen reduction reaction (ORR) or hydrogen evolution reaction (HER) for the cathode and oxygen evolution reaction (OER) or hydrogen oxidation reaction (HOR) for the anode. Rigdon, W. A. et al. (2017). Journal of Electrochemical Energy Conversion and Storage, 14(2), p. 020701; Landon, J. & Kitchin, J. R. J. Electrochem. Soc. 157, B1149 (2010); Pennline, H. W. et al. Fuel 89, 1307-1314 (2010); Winnick, J. Chem. Eng. Prog. 86, 41-45 (1990): Winnick, J. Electrochem. Sci. Eng. 1, 205-248 (1990); Li, K. & Li, N. Sep. Sci. Technol. 28, 1085-1090 (1993). For the application of DAC, the four reactions of hydrogen, oxygen, and water are poorly suited for several reasons. ORR is a convenient cathode reaction, given the oxygen in air, but the kinetic overpotential needed to drive ORR raises the energy consumption significantly. HER involves the production of a hydrogen coproduct at the cathode, which would usually be lost to the air stream, representing a significant waste of energy. HOR as an anode reaction requires a supply of hydrogen, which is energy-intensive and expensive to produce, relative to the value of captured $CO_2$. Finally, OER as an anode reaction requires a large kinetic overpotential and results in $CO_2$ produced as a mixture with the oxygen coproduct, which then requires an additional downstream separation.

Therefore, a need exists for a more efficient and cost-effective device and method for removing carbon dioxide from air.

BRIEF SUMMARY OF THE INVENTION

The present disclosure is directed to an electrochemically-driven carbon dioxide separator (EDCS) for separating carbon dioxide from a carbon dioxide-containing gas. The EDCS comprises a cell. The cell comprises: two electrodes that are capable of acting as an anode or a cathode, the two electrodes comprising a charge storage compound and an anion exchange polymer, the charge storage compound being capable of reacting to form hydroxide when acting as the cathode and reacting to consume hydroxide when acting as the anode; a membrane adjacent to and separating the two electrodes, the membrane comprising an anion exchange polymer; a channel adapted for inflow of a carbon dioxide-containing gas within the membrane; a channel adapted for outflow of carbon dioxide and defining an opening in contact with the electrode serving as the anode; and a channel adapted for outflow of carbon dioxide and defining an opening in contact with the electrode serving as the cathode. The cell is adapted such that in operation: the hydroxide produced at the electrode serving as the cathode is transported into the membrane; the carbon dioxide-containing gas is contacted with the membrane and the carbon dioxide reacts with the hydroxide ions to form bicarbonate ions, carbonate ions, or bicarbonate and carbonate ions; the bicarbonate ions, carbonate ions, or bicarbonate and carbonate ions are transported to the electrode serving as the anode through the membrane; the bicarbonate ions, carbonate ions, or bicarbonate and carbonate ions react at the electrode acting as the anode to form carbon dioxide and water; and the carbon dioxide is emitted from the EDCS through the channel adapted for outflow of carbon dioxide of the electrode serving as the anode.

Another aspect of the present disclosure is directed to an electrochemically-driven carbon dioxide separator (EDCS) for separating carbon dioxide from a carbon dioxide-containing gas. The EDCS comprises a cell. The cell comprises: two electrodes that are capable of acting as an anode or a cathode, the two electrodes comprising nickel hydroxide optionally in a partially oxidized state and an anion exchange polymer, the nickel hydroxide being capable of reacting to form hydroxide when acting as the cathode and reacting to consume hydroxide when acting as the anode; a membrane adjacent to and separating the two electrodes, the membrane comprising an anion exchange polymer; a channel adapted for outflow of carbon dioxide or inflow of a carbon dioxide-containing gas and defining an opening in contact with the electrode serving as the anode; and a channel adapted for outflow of carbon dioxide or inflow a carbon dioxide-containing gas and defining an opening in contact with the electrode serving as the cathode. The cell is adapted such that in operation: hydroxide is produced at the electrode serving as the cathode; the carbon dioxide-containing gas is contacted with the electrode serving as the cathode and the carbon dioxide reacts with the hydroxide ions to form bicarbonate ions, carbonate ions, or bicarbonate and carbonate ions; the bicarbonate ions, carbonate ions, or bicarbonate and carbonate ions are transported to the electrode serving as the anode through the membrane; and the bicarbonate ions, carbonate ions, or bicarbonate and carbonate ions react at the electrode acting as the anode to form carbon dioxide and water.

The EDCS can further comprise a power supply for supplying a current flow to the electrodes, wherein the power supply is adapted to alternately reverse the direction of current flow, thereby allowing each electrode to act, in turn, as the anode and as the cathode. Alternatively, the EDCS can further comprise a power supply for supplying a current flow to the electrodes; and an electrical switch coupled to the power supply and the electrodes; wherein the electrical switch is adapted to alternately reverse the direction of current flow, thereby allowing each electrode to act, in turn, as the anode and as the cathode.

The EDCS can further comprise a current collector adjacent to each of the electrodes.

The charge storage compound can comprise a metal hydroxide, a metal oxyhydroxide, a metal oxide, or a hydrogen storage alloy. For example, the charge storage compound can comprise nickel hydroxide, manganese dioxide, nickel hydroxide in a partially-charged state, or lanthanum nickel hydride. Preferably, the charge storage compound comprises nickel hydroxide, or nickel hydroxide in a partially-charged state.

The EDCS can further comprise an ionomer layer between the membrane and each of the two electrodes that extends along an end of each of the two electrodes to the current collector, the ionomer layer being adapted to seal carbon dioxide released from the electrode serving as the anode within the electrode serving as the anode and the channel for outflow of carbon dioxide from the electrode serving as the anode.

The ionomer layer can comprise an anion exchange polymer.

The anion exchange polymer of the two electrodes, the anion exchange polymer of the membrane and/or the anion exchange membrane of the ionomer layer independently can comprise quaternary ammonium or imidazolium groups and a polymer backbone not having ether groups.

The anion exchange polymer of the two electrodes, the anion exchange polymer of the membrane and/or the anion exchange membrane of the ionomer layer independently can comprise poly(aryl piperidinium), alkylammonium-functionalized poly(aryl alkylene), substituted-imidazolium-functionalized poly(aryl alkylene), alkylammonium-functionalized poly(styrene), substituted-imidazolium-functionalized poly(styrene), alkylammonium-functionalized poly(styrene-co-divinylbenzene), substituted-imidazolium-functionalized poly(styrene-co-divinylbenzene), alkylammonium-functionalized poly(styrene-block-ethylene-co-butadiene-block-styrene), substituted-imidazolium-functionalized, poly(styrene-block-ethylene-co-butadiene-block-styrene), alkylammonium-functionalized poly(ethylene), substituted-imidazolium-functionalized poly(ethylene), alkylammonium-functionalized poly(tetrafluoroethylene), substituted-imidazolium-functionalized poly(tetrafluoroethylene), alkylammonium-functionalized poly(ethylene-co-tetrafluoroethylene), substituted-imidazolium-functionalized poly(ethylene-co-tetrafluoroethylene), polyethyleneimine, poly(diallyl ammonium), polydiallyldimethylammonium, or a combination thereof.

The anion exchange polymer of the two electrodes, the anion exchange polymer of the membrane and/or the anion exchange membrane of the ionomer layer independently can comprise poly(aryl piperidinium).

The anion exchange polymer of the ionomer layer can comprise polydiallyldimethylammonium.

The membrane can comprise a plurality of the channel for inflow of the carbon dioxide-containing gas within the membrane.

The membrane can comprise void volume for diffusion of the carbon dioxide-containing gas through the membrane.

The cell can further comprise a check valve configured to emit carbon dioxide produced within the electrode serving as the anode from the EDCS through the channel for outflow of carbon dioxide from the electrode serving as the anode. Two such check valves can be in the EDCS since either of the two electrodes will serve as the anode during the cyclic operation of the EDCS.

The EDCS can further comprise a fan for blowing the carbon dioxide-containing gas through the channel for inflow of the carbon dioxide-containing gas within the membrane.

The carbon dioxide-containing gas can comprise air.

The EDCS can further comprise a stack comprised of one or more additional cells electrically connected in series; and a manifold adapted for outflow of carbon dioxide from each of the electrodes serving as the anode.

The ionomer layer can surround each of the two electrodes and the channels for outflow of carbon dioxide.

The current collector can comprise a bipolar plate between each cell instead of two current collector plates, and a current collector plate at each end of the stack.

The bipolar plate can be configured to provide the channels for outflow of carbon dioxide. The channels for outflow of carbon dioxide can be perpendicular to the bipolar plate and the electrodes.

Another aspect of the present disclosure is directed to a battery system comprising a metal-air battery and the EDCS as described above, wherein the carbon dioxide-containing gas is air and after the air is supplied to the EDCS to reduce the concentration of the carbon dioxide, the air having the reduced concentration of carbon dioxide is directed to a cathode inlet of the metal-air battery.

Yet another aspect of the present disclosure is directed to a method for separating carbon dioxide from a carbon dioxide-containing gas. The method comprises supplying the EDCS as described above with the carbon dioxide-containing gas; and driving electrical current through the EDCS.

The electrical current can be driven through the EDCS in a first phase in which one of the two electrodes serves as the anode and the other of the two electrodes serves as the cathode and a second phase in which current is driven so that the one of the two electrodes serves as the cathode and the other of the two electrodes serves as the anode.

Voltage of the EDCS can be monitored at a constant current so that each of the first and second phases is continued for a sufficient time to convert most or all of the nickel hydroxide in the anode to nickel oxyhydroxide and to convert most or all of the nickel oxyhydroxide in the cathode to nickel hydroxide before polarity of the cell or cells is reversed. For example, the polarity of the cell or cells can be reversed when the voltage of the EDCS is in the range of about 0.5 to about 1.0 V per cell.

The method can further comprise monitoring a ratio of nickel oxyhydroxide to total nickel hydroxide and nickel oxyhydroxide for the two electrodes combined, which when multiplied by 100 indicates a cell-average state of charge (SOC), and triggering an intervention when the ratio reaches a desired threshold value set below 0.5 or the cell-average SOC reaches a desired threshold value below 50%.

The method can further comprise monitoring a total charge passed in each of the first and second phases, and triggering an intervention when the total charge passed in one of the first and second phases falls below a predetermined fraction of nominal electrode capacity.

The intervention can comprise extending the phase of operation until a higher voltage threshold value is reached. For example, the higher voltage threshold can be in the range of about 1.0 to about 2.0 V per cell.

The intervention can comprise extending the phase of operation until a predetermined amount of charge is passed. For example, the predetermined amount of charge can range from about 80% to about 120% of nominal electrode capacity.

The intervention can comprise supplying oxygen or air to the cathode to facilitate an oxygen reduction reaction.

The intervention can comprise applying current to the EDCS to facilitate a hydrogen evolution reaction.

Other objects and features will be in part apparent and in part pointed out hereinafter.

BRIEF DESCRIPTION OF THE SEVERAL VIEWS OF THE DRAWING

Corresponding reference characters indicate corresponding parts throughout the drawings.

DETAILED DESCRIPTION OF THE INVENTION

Figure 1:
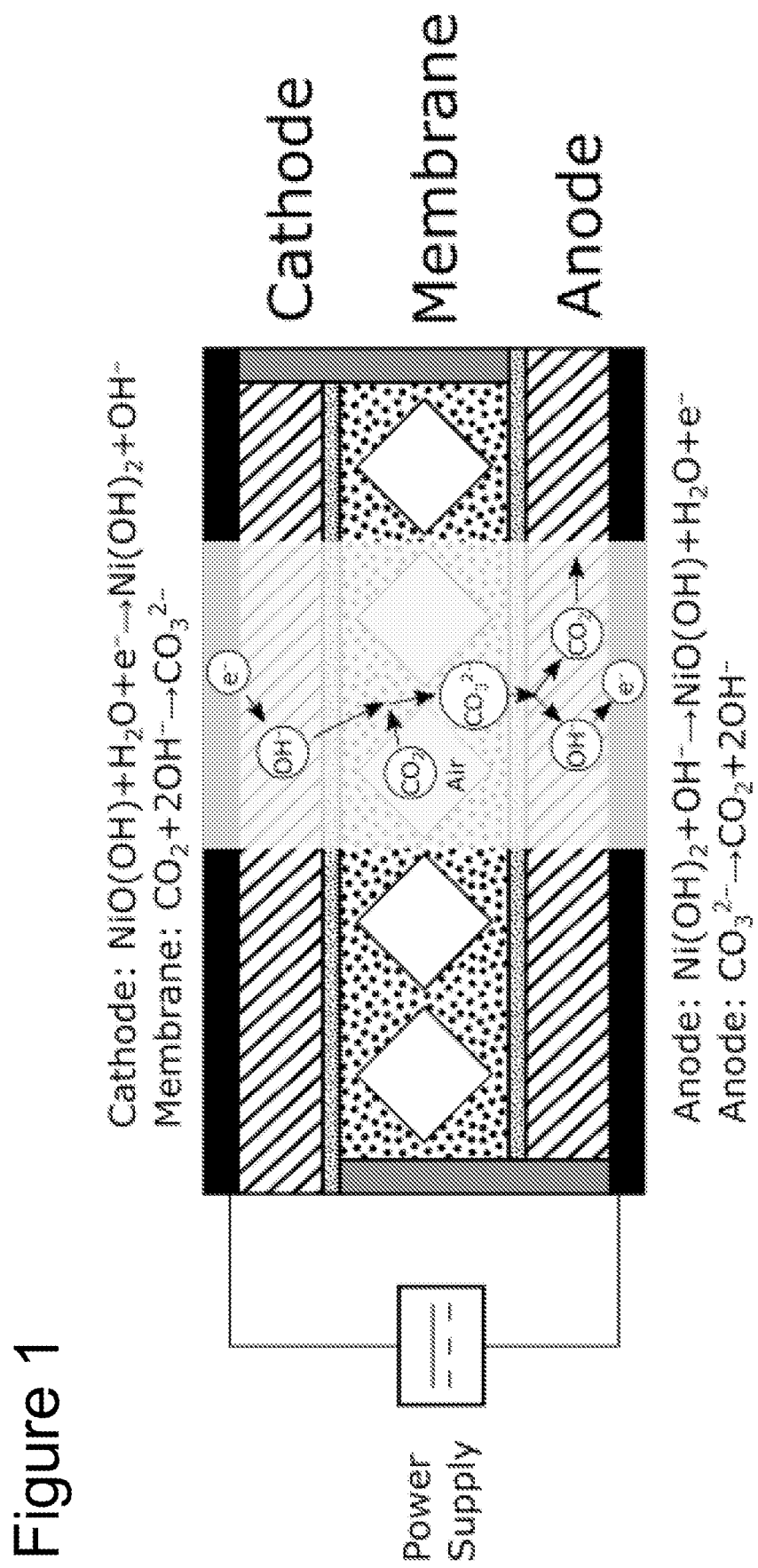
FIG. 1 is a schematic representation of the EDCS in one phase of operation, including the chemical reactions and major species involved.

The present disclosure is directed to electrochemically driven carbon dioxide separators (EDCS) and their use in separating carbon dioxide from carbon dioxide-containing gas such as air for utilization or sequestration. The EDCS is a carbon-negative technology since it can remove $CO_2$ from the atmosphere.

For example, the disclosure is directed to an electrochemically driven $CO_2$ separator comprising a cell or an EDCS stack. The EDCS stack comprises one or more cells electrically connected in series.

Each cell comprises a first electrode, a membrane, and a second electrode. The first electrode and second electrode comprise nickel hydroxide, an anion exchange polymer, and optionally a nickel foam gas diffusion layer. The first electrode and second electrode are each capable of anodic and cathodic reactions, and depending on the direction of current flow, one electrode will be the anode of the cell, while the other electrode will be the cathode of the cell.

At the anode, nickel hydroxide ($Ni(OH)_2$ is oxidized to nickel oxyhydroxide ($NiO(OH)$), consuming hydroxide anions ($OH$) in the process, according to the following equation.

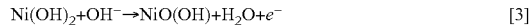
$$Ni(OH)_2 + OH^- \rightarrow NiO(OH) + H_2O + e^- \quad [3]$$

The cathode reaction is the reverse of equation 3.

$$NiO(OH) + H_2O + e^- \rightarrow No(OH)_2 + OH^- \quad [4]$$

The hydroxide anions produced at the cathode are transported by an ionomer layer comprising an anion exchange polymer into the membrane. The membrane comprises an anion exchange polymer and integrated carbon dioxide-containing gas flow channels. Within the membrane, carbon dioxide from air reacts with hydroxide anion to make bicarbonate and carbonate anions, according to Equations 1 and 2.

The bicarbonate, carbonate, and any remaining hydroxide anions are transported from the membrane into the anode. In the anode, the consumption of hydroxide via Equation 3 causes a reduction in pH, which causes the bicarbonate and carbonate to decompose, releasing carbon dioxide and hydroxide anions, according to the reverse of Equations 1 and 2. Pure carbon dioxide is collected from the anode.

The cell further comprises a first carbon dioxide flow channel in fluid communication with the first electrode and a second carbon dioxide flow channel in fluid communication with the second electrode. Depending on the direction of current flow, the first carbon dioxide flow channel collects carbon dioxide when the first electrode is serving as anode, and the second carbon dioxide flow channel collects carbon dioxide when the second electrode is serving as anode.

The stack further comprises a first manifold in fluid communication with the first carbon dioxide flow channel of each cell and a second manifold in fluid communication with the second carbon dioxide flow channel of each cell.

The EDCS further comprises a check valve connected to the first manifold and a check valve connected to the second manifold. Product carbon dioxide is collected from the EDCS through the check valves, and the check valves are oriented to prevent backflow of carbon dioxide into the manifold, flow channel, and electrode when that electrode is serving as cathode.

Additionally, the disclosure is directed to a method for separating carbon dioxide from carbon dioxide-containing gas comprising supplying the carbon dioxide-containing gas flow channels of the membrane of the EDCS described herein with carbon dioxide-containing gas and driving electrical current through the EDCS in a cyclic manner. The cyclic supply of electrical current comprises a first phase in which current is driven so that the first electrode serves as anode and the second electrode serves as cathode and a second phase in which current is driven so that the first electrode serves as cathode and the second electrode serves as anode. Each phase is continued for sufficient time to convert most or all of the nickel hydroxide in the anode to nickel oxyhydroxide and to convert most or all of the nickel oxyhydroxide in the cathode to nickel hydroxide.

To determine when near-complete conversion of the electrodes has taken place, the EDCS voltage is monitored. When the voltage exceeds a predetermined threshold at a constant current, the polarity of the cell is reversed. The voltage threshold may be in the range of 0.5 to 1.0 V per cell.

Cell average state of charge (SOC) of the electrode is defined as the ratio of nickel oxyhydroxide to total nickel hydroxide and nickel oxyhydroxide in the electrodes combined, so that complete conversion to nickel oxyhydroxide represents 100% SOC and complete conversion to nickel hydroxide represents 0% SOC. During normal operation, the average SOC of the first and second electrode combined should be approximately 50%. If the average SOC diverges significantly from 50%, the extent of cycling of the electrodes will be limited. For example, if the average SOC is 30%, then each electrode will only be able to cycle from 0-60% SOC. Over time, side reactions such as oxygen evolution reaction (OER) can cause a gradual decrease in the average SOC of the cell.

When the cell average SOC has dropped substantially below 50%, an additional intervention can be applied to raise the average SOC of the cell, in order to prolong the lifetime of the device. One intervention is to continue to drive current through the cell, even after the cathode has reached near 0% SOC and the cathode potential has dropped below the normal range. At sufficiently low cathode potential, one of two cathodic side reactions can take place to allow current to continue to flow: oxygen reduction reaction, or hydrogen evolution reaction.

Additionally, the disclosure is directed to a method for separating carbon dioxide from carbon dioxide-containing gas, in which the average SOC of the cell is monitored by tracking the total charge passed in each phase, and in which an intervention is triggered when the charge passed falls below a predetermined fraction of the nominal electrode capacity. The intervention may involve extending the current phase of operation until a higher voltage threshold is reached. The higher voltage threshold may be in the range of 1.0-2.0 V per cell. Alternatively, the intervention may involve extending the current phase of operation until a predetermined amount of charge is passed. The predetermined charge may range from 80% to 120% of the nominal electrode capacity. The intervention may additionally involve supplying oxygen or air to the cathode of the EDCS in order to facilitate oxygen reduction reaction. However, supply of oxygen is not mandatory, as current may be passed by hydrogen evolution reaction instead.

A schematic of an EDCS is shown in FIG. 1, where one electrode is labeled as cathode and the other electrode is labeled as anode. Current is supplies to the cell from a power supply. Hydroxide anion is generated electrochemically at the cathode by reduction of a charge storage compound such as nickel oxyhydroxide and is transported into the membrane. In the membrane, hydroxide reacts with carbon dioxide from a carbon dioxide containing gas (preferably air) supplied to the membrane flow channels. The resulting carbonate and bicarbonate are transported to the anode. In the anode, oxidation of nickel hydroxide consumes hydroxide, causing a drop in pH and decomposition of carbonate and bicarbonate to release carbon dioxide. The carbon dioxide product gas flows out of the anode. During the first and second phases of the cycle, the electrodes that serve as anode and cathode will alternate. However, the mechanism of the cell as depicted in FIG. 1, using the labels anode and cathode, applies to both phases.

Figure 2:
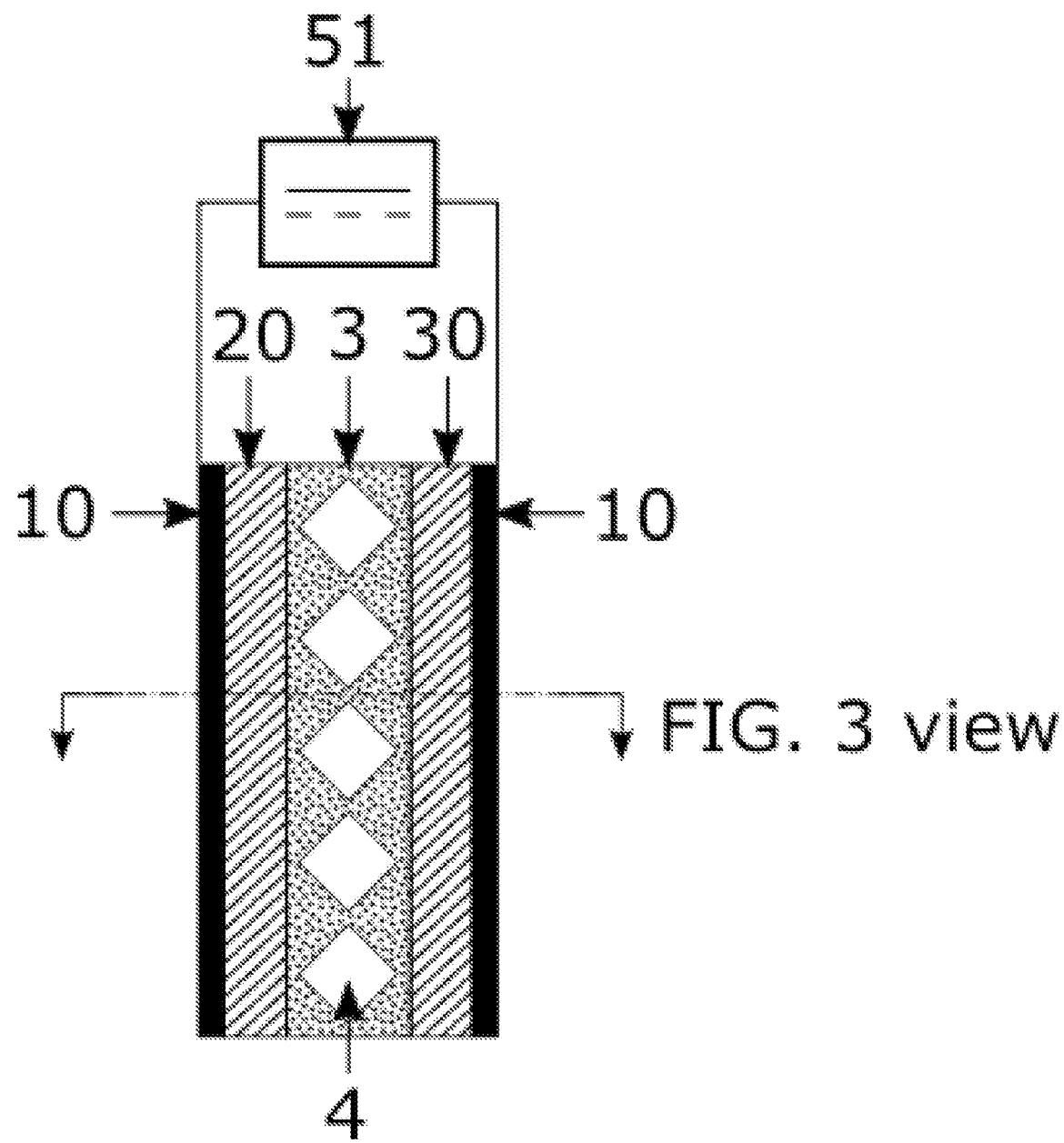
FIG. 2 is a front cross-sectional view of an EDCS cell taken along the line as shown in FIG. 3.

A front cross-sectional schematic of an EDCS cell is shown in FIG. 2. The cell comprises a first electrode 20, a membrane 3, and a second electrode 30. The cell can further comprise current collector plates 10, adjacent to each electrode. The membrane comprises an anion exchange polymer and carbon dioxide-containing gas flow channels 4 that allow carbon dioxide-containing gas to pass through the membrane. Optionally, the membrane can be porous so that it contains pore volume in addition to carbon dioxide-containing gas flow channels 4 to allow carbon dioxide to diffuse through the bulk of the membrane more rapidly. A power supply 51 supplies current to the current collector plates.

Figure 3:
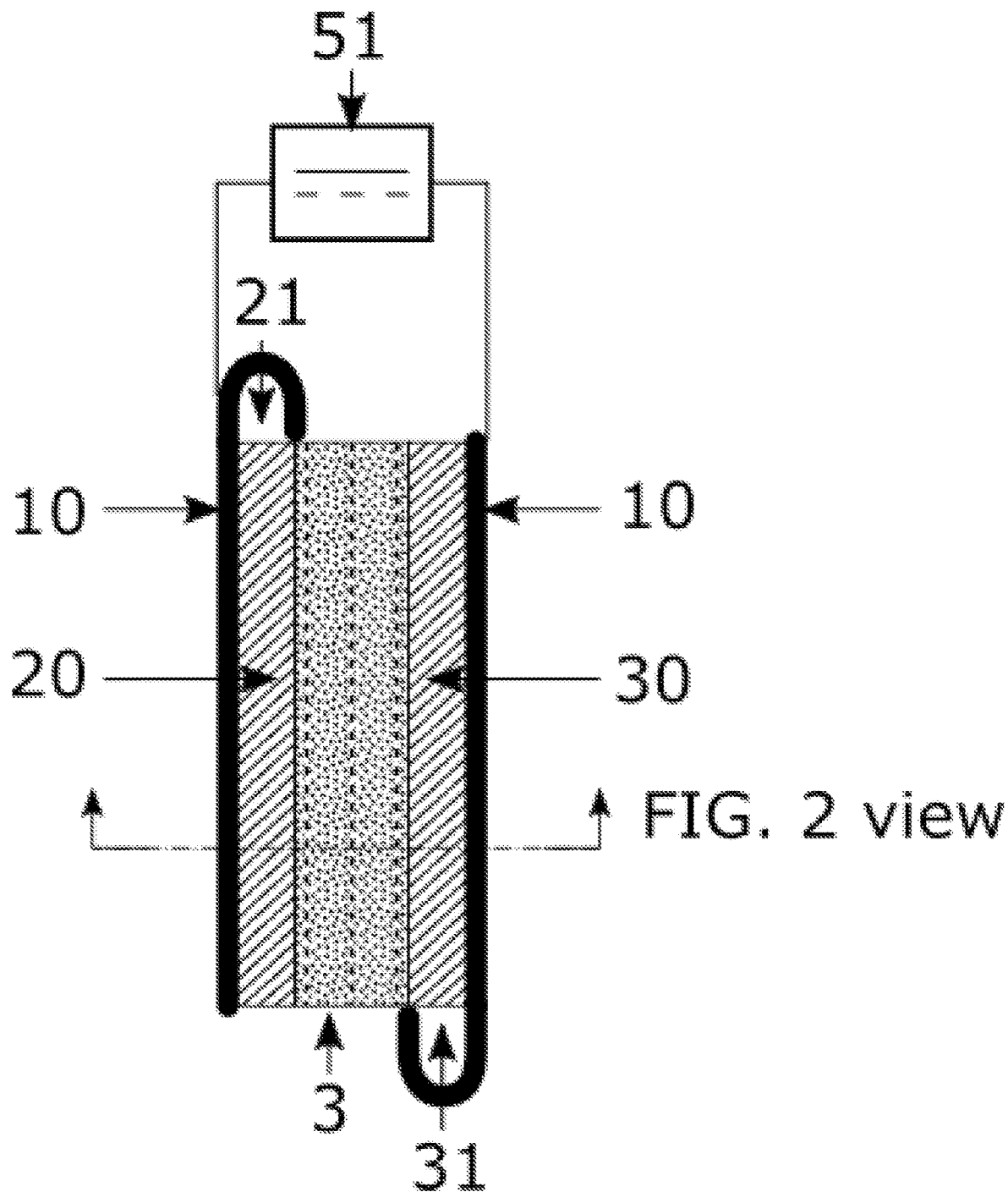
FIG. 3 is a top cross-sectional view of an EDCS cell taken along the line as shown in FIG. 2.

A top cross-sectional schematic of an EDCS cell is shown in FIG. 3. The cell comprises a first carbon dioxide collection channel 21 in fluid communication with the first electrode 20 and a second carbon dioxide collection channel 31 in fluid communication with the second electrode 30. These collection channels 21, 31 are for outflow of carbon dioxide from the electrode serving as the anode.

Figure 4:
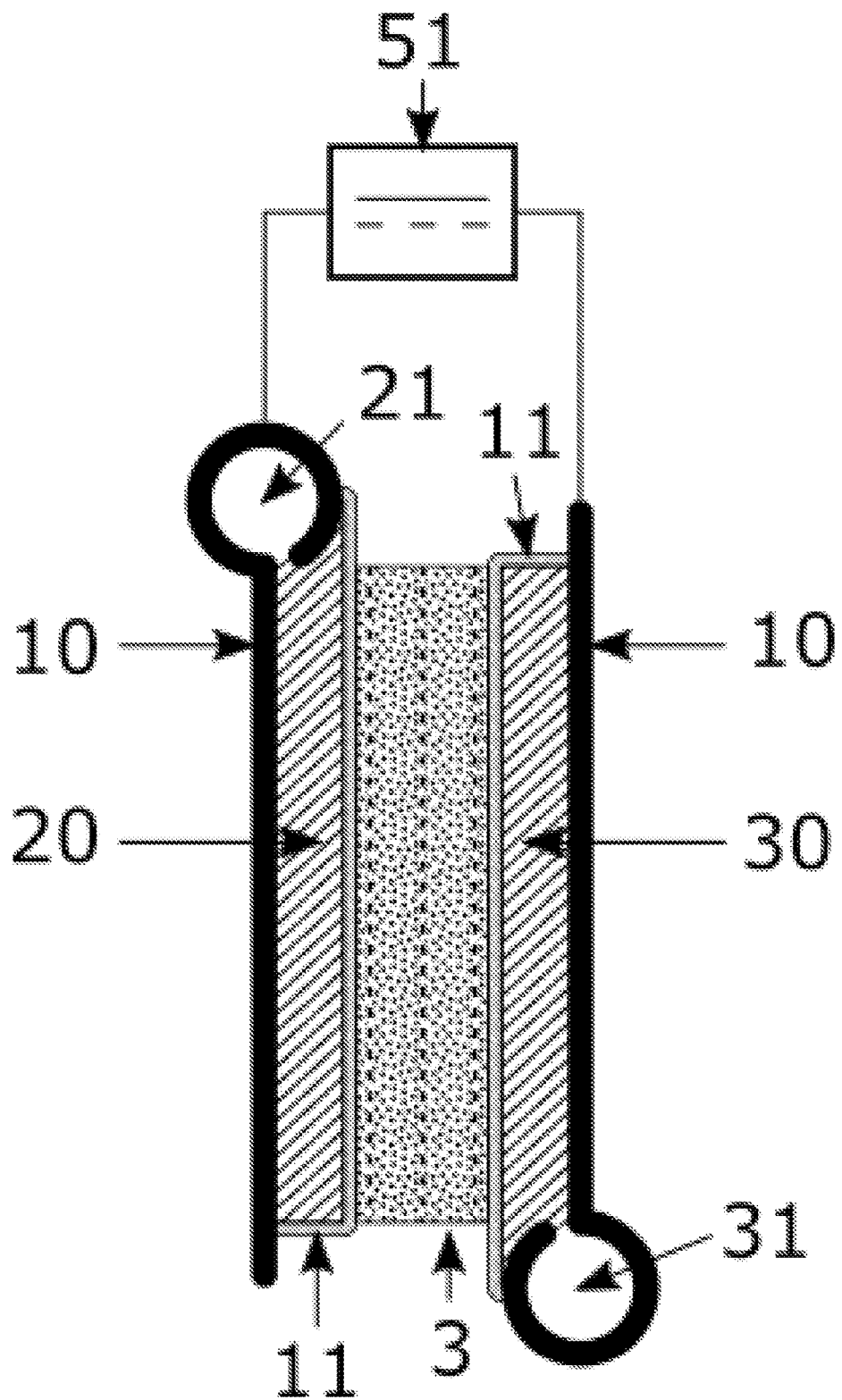
FIG. 4 is a top cross-sectional view of an EDCS cell that includes an ionomer layer between each of the electrodes and the membrane that extends along an end of each of the two electrodes to the current collector.

A top cross-sectional schematic of a preferred embodiment of an EDCS cell is shown in FIG. 4. The cell optionally comprises ionomer layers 11 inserted between the electrodes and the membrane. The ionomer layers can optionally envelope the electrode, the carbon dioxide collection channels, and the current collector plate to provide a gas-tight seal around the electrodes. The ionomer layer comprises an anion exchange polymer.

If the membrane is porous, a layer of a dense anion exchange polymer capable of preventing leakage of carbon dioxide out of the anode can be used instead of an ionomer layer.

Figure 5:
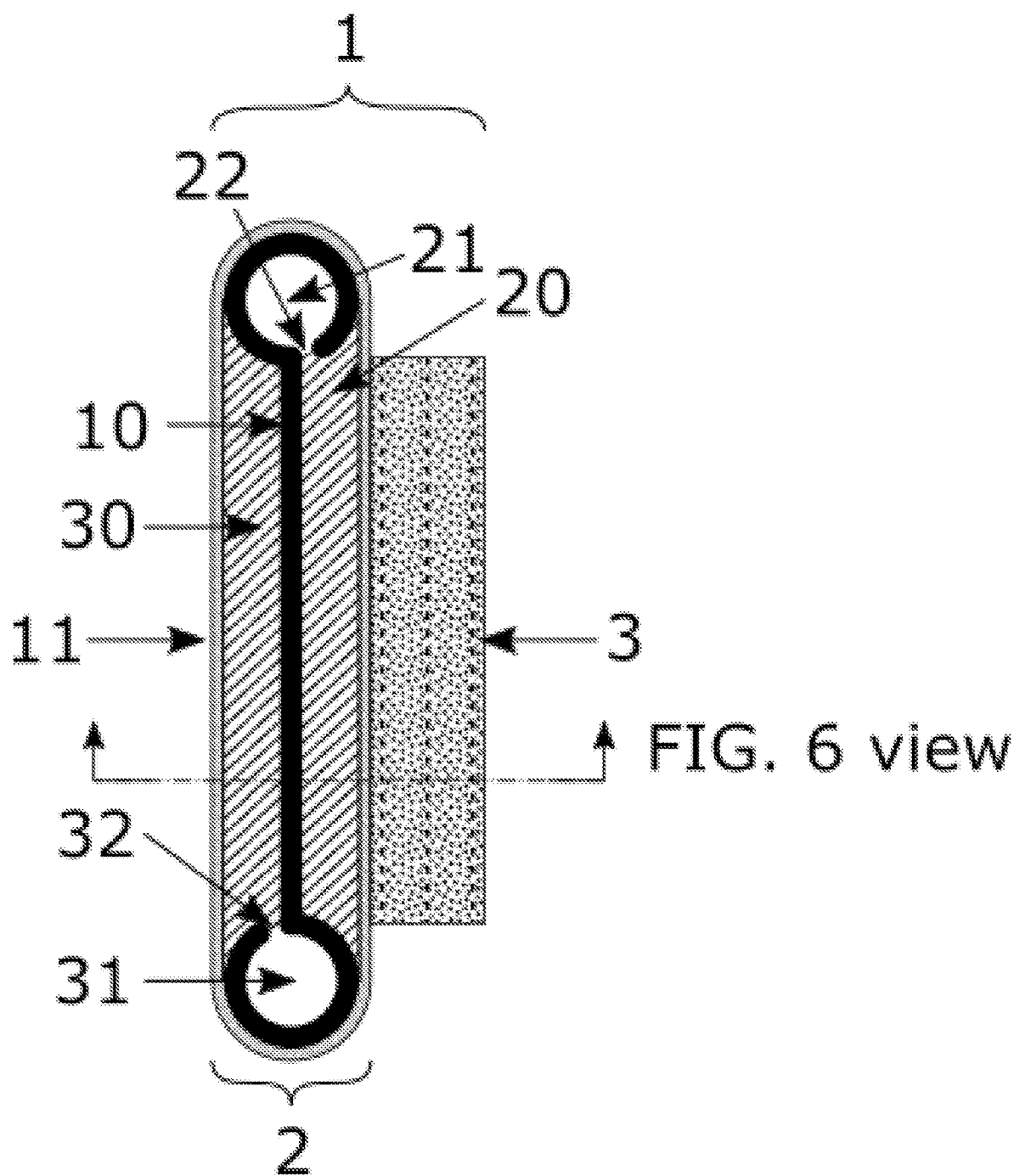
FIG. 5. is a top cross-sectional view of an EDCS repeating unit taken along the line as shown in FIG. 6.

A top cross-sectional schematic of a repeat unit is shown in FIG. 5, where the EDCS comprises a stack of one or more repeat units 1. Each unit 1 comprises a bipolar electrode assembly 2 and a membrane 3. Although an EDCS comprises one or more cells as described above, it can be more convenient to manufacture the stack from the repeat units 1 rather than from individual cells.

The bipolar electrode assembly 2 comprises the second electrode 20 and second carbon dioxide collection channel 21 of one cell and the first electrode 30 and first carbon dioxide collection channel 31 of an adjacent cell. The two adjacent current collectors are replaced with a single bipolar plate 10. Optionally, the bipolar electrode assembly may further comprise an ionomer layer 11 that envelops the exterior of the electrodes, bipolar plate, and carbon dioxide flow channels.

The first and second electrodes 20 and 30 can comprise nickel hydroxide electrocatalyst and an anion exchange polymer with porosity sufficient to enable gas transport.

The first and second electrodes 20 and 30 can further comprise an electrically conductive additive such as graphite, carbon black, or metallic nickel.

The first and second carbon dioxide flow channels 21, 31 can be formed from the bipolar plate 10 by rolling the plate to create channels with gaps 22, 32 to allow fluid communication with the first and second electrodes 20 and 30, respectively.

Optionally, the bipolar electrode 2 further comprises an ionomer envelope 11 in contact with the first electrode 20, first carbon dioxide collection channel 21, second electrode 30, and second carbon dioxide collection channel 31. The ionomer envelope 11 provides a gas-tight seal to isolate the first electrode 20 and the second electrode 30 from the ambient environment.

Figure 6:
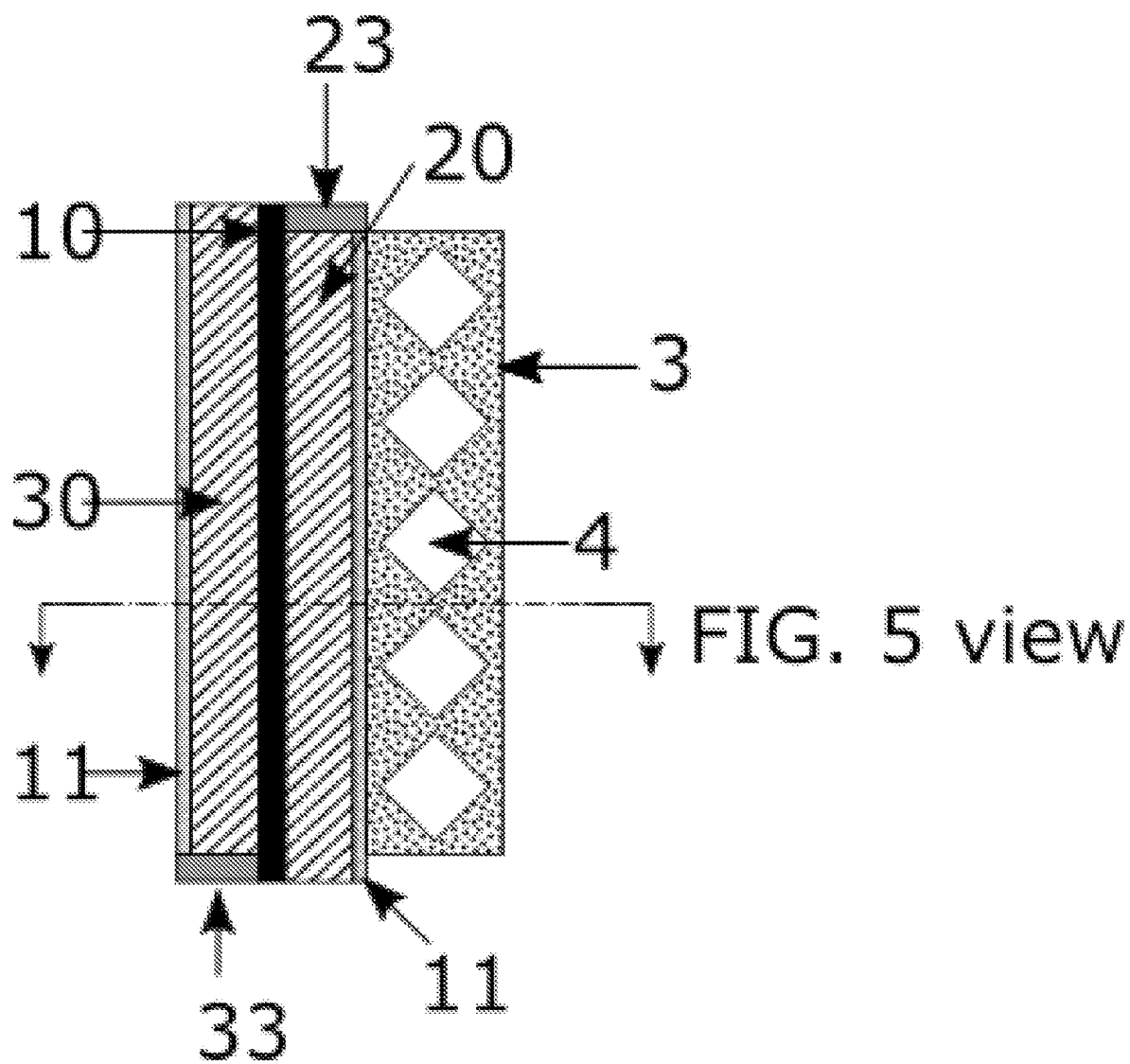
FIG. 6 is a front cross-sectional view of the EDCS repeating unit taken along the line as shown in FIG. 5.

A front cross-sectional view of the bipolar electrode 2 is shown in FIG. 6. The bipolar electrode 2 comprises a gasket 33 to seal an end of the second electrode 30, and a gasket 23 to seal an end of the first electrode 20. Optionally, the ionomer envelope 11 can be in contact with the bipolar plate 10. The unsealed ends 26, 36 of the first and second electrodes 20, 30 are in fluid communication with the first and second carbon dioxide flow channels 21, 31 (FIG. 5), respectively.

Figure 7:
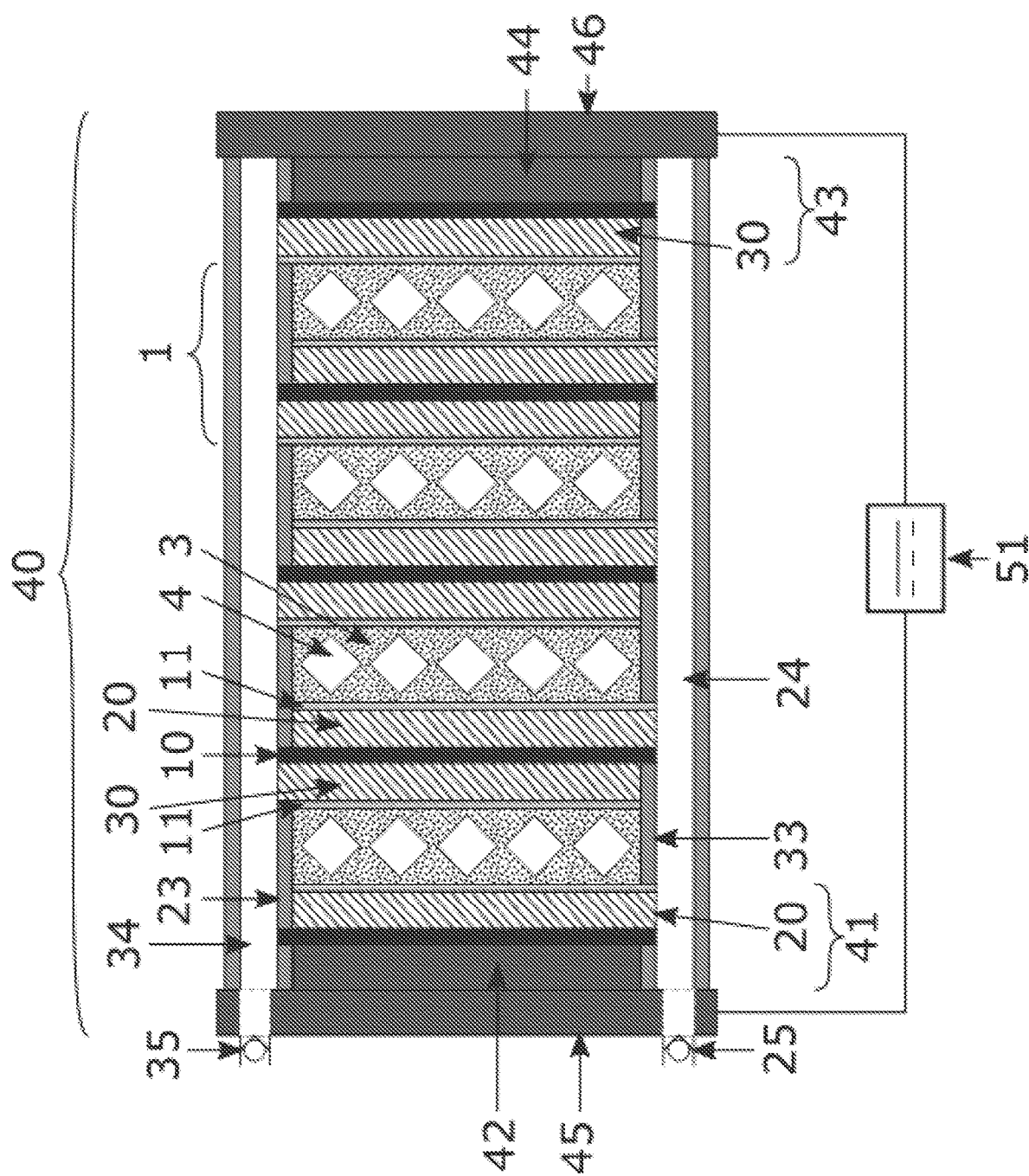
FIG. 7 is a front cross-sectional view of an EDCS stack.

Planar modules comprise a stack of planar cells, with manifolds incorporated into the border region outside of the active area to distribute gases to each cell. Cells may be separated by bipolar plates that incorporate flow channels or the cells may be separated by planar bipolar plates with conductive mesh feed spacers used to provide flow pathways. The former is shown in FIG. 7. The cells are electrically connected in series by electrically conductive bipolar plates. Although a planar configuration is illustrated, the EDCS can be made in other configurations such as a spiral stack as is known in the art.

A front cross-sectional view of a stack 40 comprising multiple repeating units 1 electrically connected in series is shown in FIG. 7. The stack 40 comprises a first manifold 24 and a second manifold 34 for providing fluid communication within the stack 40. Alternatively, both of the first and second manifolds 24, 34 can be located at the top or at the bottom of the bipolar electrodes 2. Optionally, additional manifolds can be added to create both inlet and outlet manifolds for each carbon dioxide flow channel. The first carbon dioxide flow channel 21 of each unit 1 is in fluid communication with the first manifold 24. The second carbon dioxide flow channel 31 of each unit 1 is in fluid communication with the second manifold 34.

Figure 8:
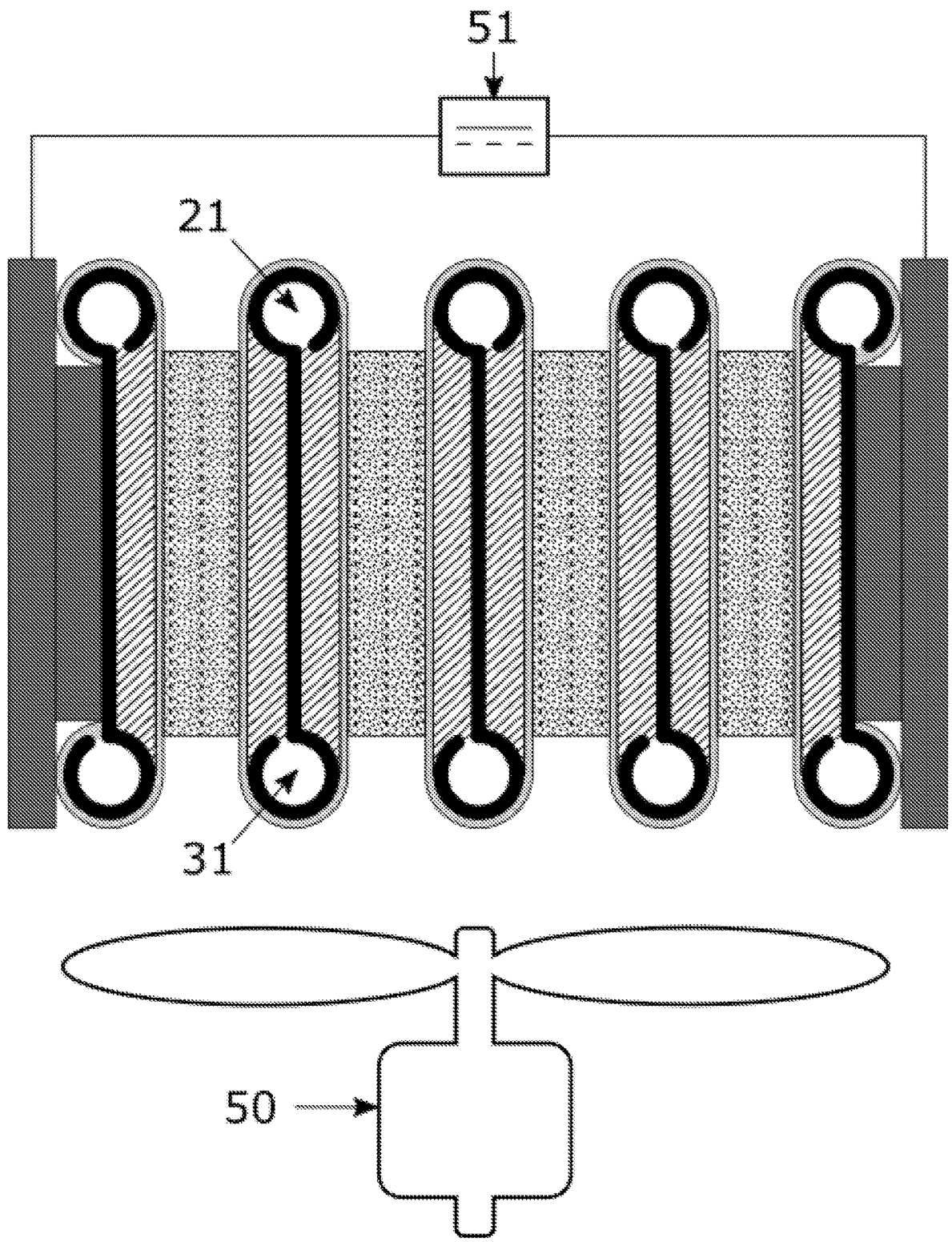
FIG. 8 is a top cross-sectional view of the EDCS stack.

In FIG. 8, a top cross-sectional view of the stack 40 is shown with the first and second carbon dioxide flow channels 21, 31 in a vertical orientation (perpendicular to the plane of the paper) and the carbon dioxide-containing gas flow channels 4 (not shown) in a horizontal orientation (parallel to the plane of the paper). Although this orientation is depicted, the device can be built or used in any orientation.

Each bipolar electrode 2 of the stack 40 includes a gasket 33 to seal the end of the second electrode 30 and second carbon dioxide flow channel 31 (not shown) to prevent fluid communication with the first manifold 24, and a gasket 23 to seal an end of the first electrode 20 and first carbon dioxide flow channel 21 (not shown) to prevent fluid communication with the second manifold 34.

In the stack 40, the repeating unit 1 comprises one bipolar electrode 2 and one membrane 3. However, the boundaries of the repeating unit are not aligned with the boundaries of a single cell. A single cell comprises the second electrode 30 and membrane 3 of one repeat unit 1 and the first electrode 20 of the next adjacent repeat unit 1.

At the right end of the stack shown in FIG. 7, an end electrode 43 is included adjacent to the current collector 46 to complete the final cell. The bipolar electrode 2 of the first repeat unit 1 at the left end of the stack 40 can also be considered an end electrode 41. The end electrodes 41, 43 can be the same or similar in construction to the bipolar electrode 2, in which case the extra electrode and extra carbon dioxide flow channel are present but are not used in the operation of the stack 40.

Alternatively, the end electrodes 41, 43 may be constructed with only a single electrode, bipolar plate, and a single carbon dioxide flow channel, and include metal spacers 42, 44 between the bipolar plate 10 of the end electrode 41, 43 and the current collectors 45, 46.

The end electrodes 41, 43 are electrically connected to current collectors 45, 46 to which the external electrical connections to the stack are made.

The first and second manifolds 24, 34 have outlets with check valves 25, 35 to prevent backflow of carbon dioxide into the stack 40. During operation, the electrode serving as cathode will consume any available carbon dioxide within the pore volume of the electrode, the carbon dioxide flow channel, and the manifold, but this quantity of carbon dioxide is limited. The check valve prevents inflow of additional carbon dioxide, so that the carbon dioxide is consumed quickly. The check valves also control air inflow into the cathode side of the cell or stack, air outflow (from which $CO_2$ has been removed) from the cathode side of the cell or stack, and carbon dioxide outflow from the anode side of the cell or stack.

The EDCS can further comprise a fan 50 to improve circulation of the carbon dioxide-containing gas through the channels 4 and through the cathode void volume, if present.

Figure 12:
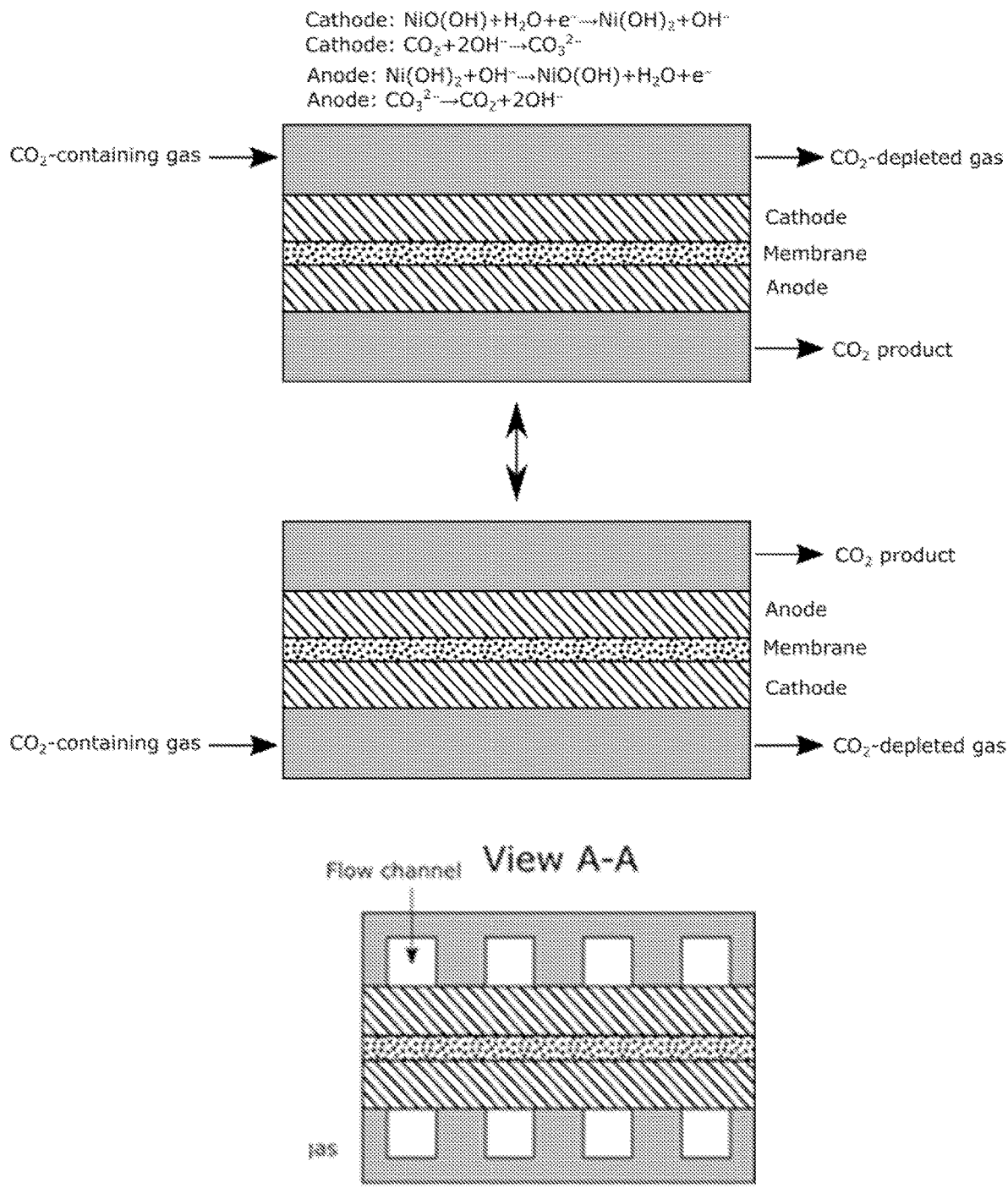
FIG. 12 shows a schematic representation of an EDCS in which the carbon-dioxide containing gas is directed to the cathode, in both phases of operation.

Alternatively, the membrane does not comprise flow channels, and the electrode flow channels are adapted for the flow of both a carbon dioxide-containing gas and a carbon dioxide product gas. The carbon dioxide-containing gas is directed to the electrode serving as cathode, as shown in FIG. 12. The carbon dioxide product gas is collected from the electrode serving as anode. The reaction of hydroxide and carbon dioxide takes place within the cathode instead of within the membrane.

The EDCS can include a gas diffusion layer on the outer side of the electrode. The gas diffusion layer can comprise any suitable material known in the art such as carbon paper. For example, the gas diffusion layer can comprise Toray Paper 060 with 5% and 10% wet proofing, and/or Sigracet 29BC.

The anion exchange polymer used in the two electrodes, membrane or ionomer layer can comprise poly(aryl piperidinium), alkylammonium-functionalized poly(aryl alkylene), substituted-imidazolium-functionalized poly(aryl alkylene), alkylammonium-functionalized poly(styrene), substituted-imidazolium-functionalized poly(styrene), alkylammonium-functionalized poly(styrene-co-divinylbenzene), substituted-imidazolium-functionalized poly(styrene-co-divinylbenzene), alkylammonium-functionalized poly(styrene-block-ethylene-co-butadiene-block-styrene), substituted-imidazolium-functionalized, poly(styrene-block-ethylene-co-butadiene-block-styrene), alkylammonium-functionalized poly(ethylene), substituted-imidazolium-functionalized poly(ethylene), alkylammonium-functionalized poly(tetrafluoroethylene), substituted-imidazolium-functionalized poly(tetrafluoroethylene), alkylammonium-functionalized poly(ethylene-co-tetrafluoroethylene), substituted-imidazolium-functionalized poly(ethylene-co-tetrafluoroethylene), polyethyleneimine, poly(diallyl ammonium), polydiallyldimethylammonium, or a combination thereof. Poly(arylpiperidinium) or polydiallyldimethylammonium are preferred.

The anion exchange polymer in the two electrodes are preferably the same.

The ionomer provides a hydroxide-conducting network. All experiments used PAP membranes and ionomers. The PAP membranes and ionomers are described in U.S. Pat. No. 10,290,890, U.S. application Ser. No. 16/651,622, and PCT Publication No. WO 2019/068051, herein incorporated by reference in their entirety. A preferred ionomer is PAP-TP-85.

The anion exchange polymer in the membrane can differ from the anion exchange polymer in the electrodes or the anion exchange polymer in the ionomer layer. The anion exchange polymer in these components can be the same, some can be the same, or all can be different.

Battery electrode reactions of the EDCS require cyclic operation, with current flow reversed periodically to alternate which electrode is the cathode and produces hydroxide, and which electrode is the anode and concentrates carbon dioxide.

A current is supplied to the EDCS by a power supply. The power supply can directly reverse its output current or a dual pole dual throw switch/relay can be used to reverse the connections between the terminals of the EDCS and the terminals of the power supply.

A typical bipolar plate is a thin sheet of stainless steel. One side is electrically connected to the anode, and the other side is electrically connected to the cathode of the adjacent cell.

The electrodes can be prepared by methods known in the art. The electrodes can be prepared from an ink containing a charge storage compound as described herein and an anionic exchange polymer that is then sprayed or casted onto an adjacent component of the cell. Alternatively, the charge storage compound can be electrodeposited onto a substrate and then coated with the anion exchange polymer. For example, $Ni(OH)_2$ electrodes can be prepared by electrodeposition from nickel chloride ($NiCl_2$) solution onto a substrate using a three-electrode cell followed by pre-cycling in potassium hydroxide solution to generate NiO(OH). The NiO(OH)/$Ni(OH)_2$ electrodes are then dip coated with an anion exchange polymer from a solution.

The EDCS cell or EDCS stack can be constructed using standard methodology that is well known in the art.

The EDCSs as described herein provide low cost electrochemical cells to efficiently remove $CO_2$ with minimal energy cost relative to traditional energy sources and long cycle life. The resulting $CO_2$ can be used for chemical synthesis. The air from which the carbon dioxide gas has been removed can be fed to a metal-air battery or other device or process using an air intake.

The EDCS described herein can have the carbon dioxide-containing gas supplied to a metal air battery contain less than about 20 ppm, 18 ppm, 16 ppm, 15 ppm, 12 ppm, 10 ppm, 8 ppm, 6 ppm, 5 ppm, 4 ppm, 3 ppm, or 2 ppm carbon dioxide with these reduced levels achieved by reaction of $CO_2$ with the hydroxide ions at the cathode of the EDCS.

If a flue gas such as those produced by a power plant is the carbon dioxide-containing gas, the flue gas can be released into the atmosphere after removal of $CO_2$, or can be further processed to remove other contaminants before it is released.

The EDCS is a carbon negative emission, direct air capture technology that can be used to offset the effects of carbon emitting technologies such as fossil fuels, industrial processes and land use with a goal toward achieving net zero $CO_2$ emissions to minimize climate change.

The EDCS does not involve the handling of liquids or solids or need high temperature calcination as is required by some carbon negative technologies.

Although the inventions disclosed here are illustrated by the application of DAC, other applications are possible. Examples for those applications include removal of $CO_2$ from air coming into a building or inside a building, allowing higher recirculation rate and thus saving HVAC energy consumption; removing $CO_2$ manned spacecraft; and pumping $CO_2$ from ambient air into green houses or other structures to help the growth of plants.

DEFINITIONS

The "bipolar plate" provides an electrical connection between the cathode of one cell and the anode of an adjacent cell.

"sipm" is a unit of gas flow rate corresponding to 1 L/minute at standard conditions of 0° C. and 1 atm pressure.

Having described the invention in detail, it will be apparent that modifications and variations are possible without departing from the scope of the invention defined in the appended claims.

EXAMPLES

The following non-limiting examples are provided to further illustrate the present invention.

Example 1: Electrode Preparation $Ni(OH)_2$ electrodes were created by electrodeposition from nickel chloride ($NiCl_2$) solution onto a nickel foam substrate using a three-electrode cell. More specifically, the electrode was electrodeposited on nickel foam of approximately 5 cm by 5 cm dimensions with 10 mA/$cm^2$ current density in a 0.1 M $NiCl_2$ solution for 30 min followed by pre-cycling in 0.1 M KOH solution to generate NiO(OH). The NiO(OH)/$Ni(OH)_2$ electrodes were dip coated with poly(aryl piperidinium) ionomer from a 5 wt. % solution in ethanol solvent.

Example 2: EDCS Preparation

A full EDCS cell was constructed using a poly(aryl piperidinium) membrane and two NiO(OH)/$Ni(OH)_2$ electrodes. The cell was assembled in a 25 $cm^2$ single cell fuel cell fixture with triple serpentine flow fields. A gasket with a 5 cm by 5 cm opening was placed on the anode flow field.

Next, a 5 cm by 5 cm carbon paper gas diffusion layer was placed in the opening on the anode flow field. The first NiO(OH)/Ni(OH)$_2$ electrode was placed on the gas diffusion layer. A 7.5 cm×7.5 cm membrane was placed over the electrode and gasket. A second gasket with 5 cm by 5 cm opening was placed on the membrane, and the second electrode was placed inside the opening in contact with the membrane. A second 5 cm by 5 cm carbon paper gas diffusion layer was placed on the second electrode. Finally, the cathode flow field was placed and the cell was closed.

Example 3: EDCS Operation and Performance

The cell was operated at 60° C. with both the anode and the cathode supplied by 0.5 slpm of air containing 440 ppm $CO_2$ and humidified to 57.7° C. dew point. Both the anode and cathode outlets were passed through condensers to remove water and directed to $CO_2$ analyzers to measure the content of $CO_2$. The cell was connected to a potentiostat to control cell voltage and measure current. The cell was run with a series of voltage hold steps: −0.8 V for 1200 s, −0.3 V for 600 s, 0.3 V for 970 s, −0.3 V for 1800 s, and 0.3 V for 1350 s.

Figure 9:
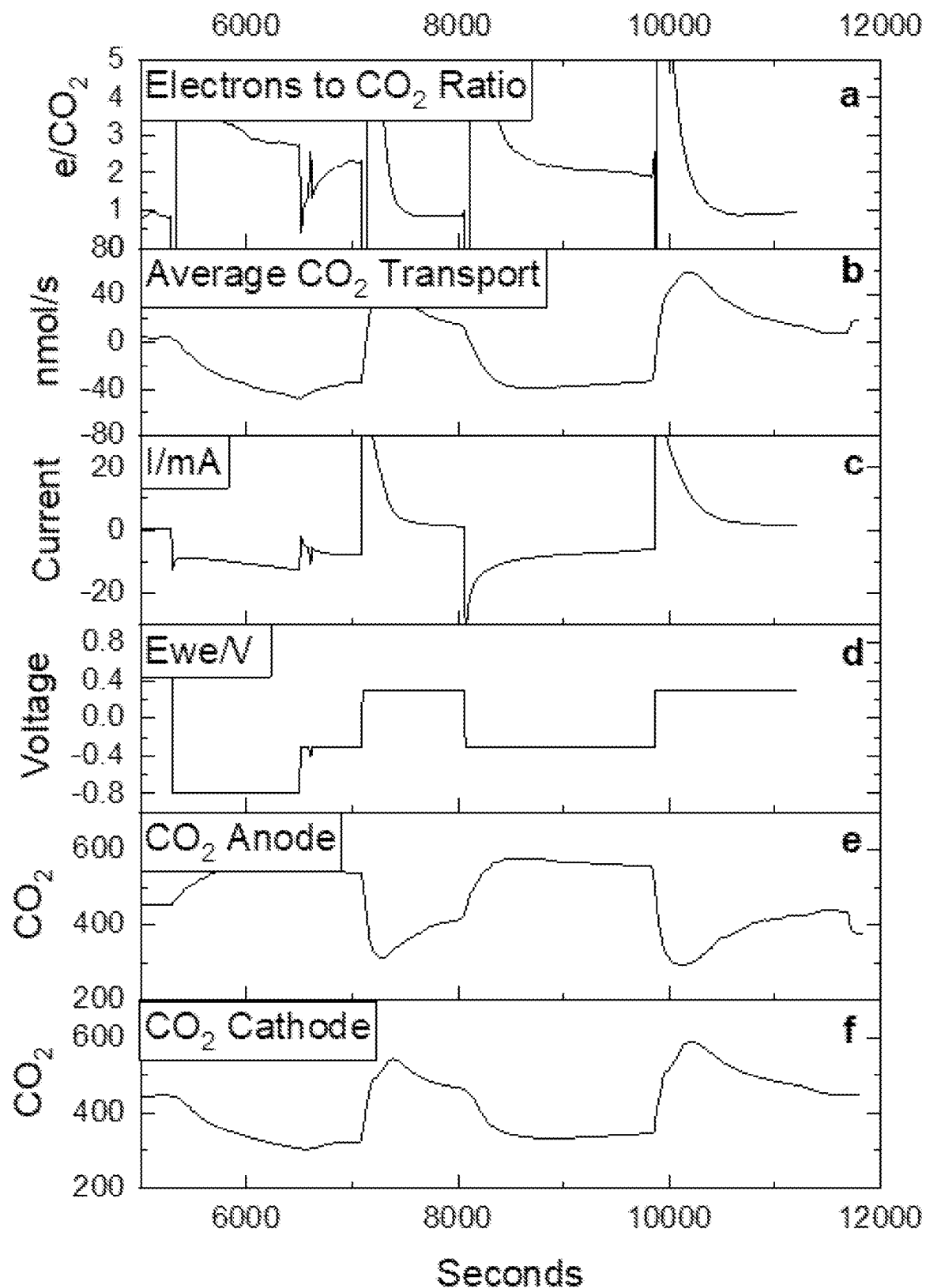
FIG. 9 is a plot of the calculated ratio of electrons passed per $CO_2$ molecule transported, the calculated rate of $CO_2$ transport, the cell current, the cell voltage, the anode outlet $CO_2$ concentration and the cathode outlet $CO_2$ concentration as a function of time as reported in Example 1.

The results are shown in FIG. 9, including current, voltage, $CO_2$ concentration in anode and cathode outlet streams, calculated rate of $CO_2$ transport through the cell, and the calculated ratio of electrons passed per molecule of $CO_2$ transported. $CO_2$ was shown to be transported in both directions, depending on the polarity of the applied voltage. The ratio of electrons passed to $CO_2$ molecule transported typically ranged from 1 to 2, indicating near-complete conversion of hydroxide to carbon and bicarbonate within the cathode of the EDCS.

Figure 10:
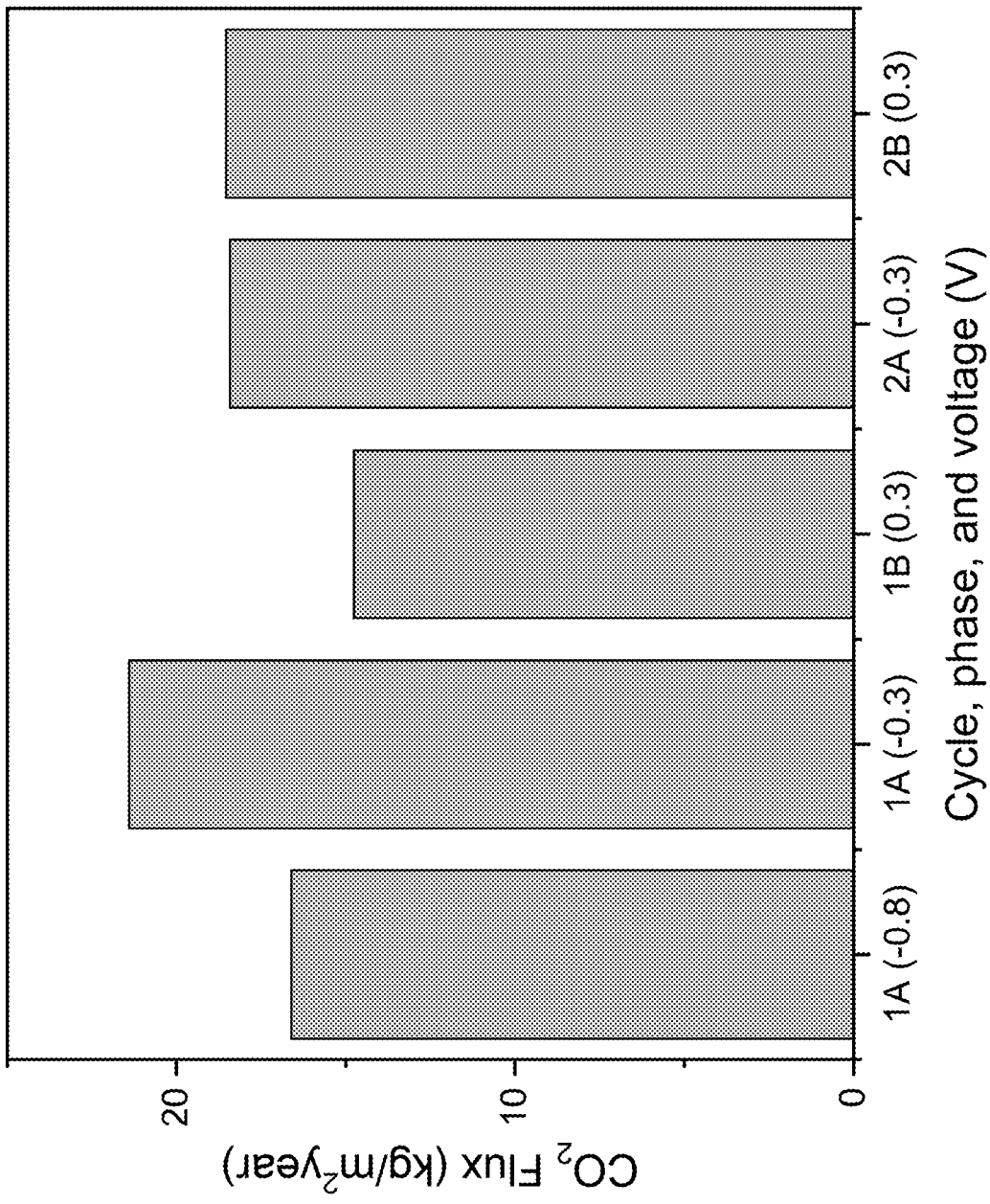
FIG. 10 is a bar graph showing the average $CO_2$ flux as calculated from the experiment in Example 1 and averaged over each cell voltage hold step.

In FIG. 10, the $CO_2$ flux is shown, averaged over each voltage hold step, normalized by cell area, and converted to an annual basis. The hold at −0.8 V did not perform significantly better than the holds at +/−0.3 V, despite the higher energy consumption. Averaging over the holds at +/−0.3 V, the $CO_2$ flux was 19 kg/m$^2$-year.

Figure 11:
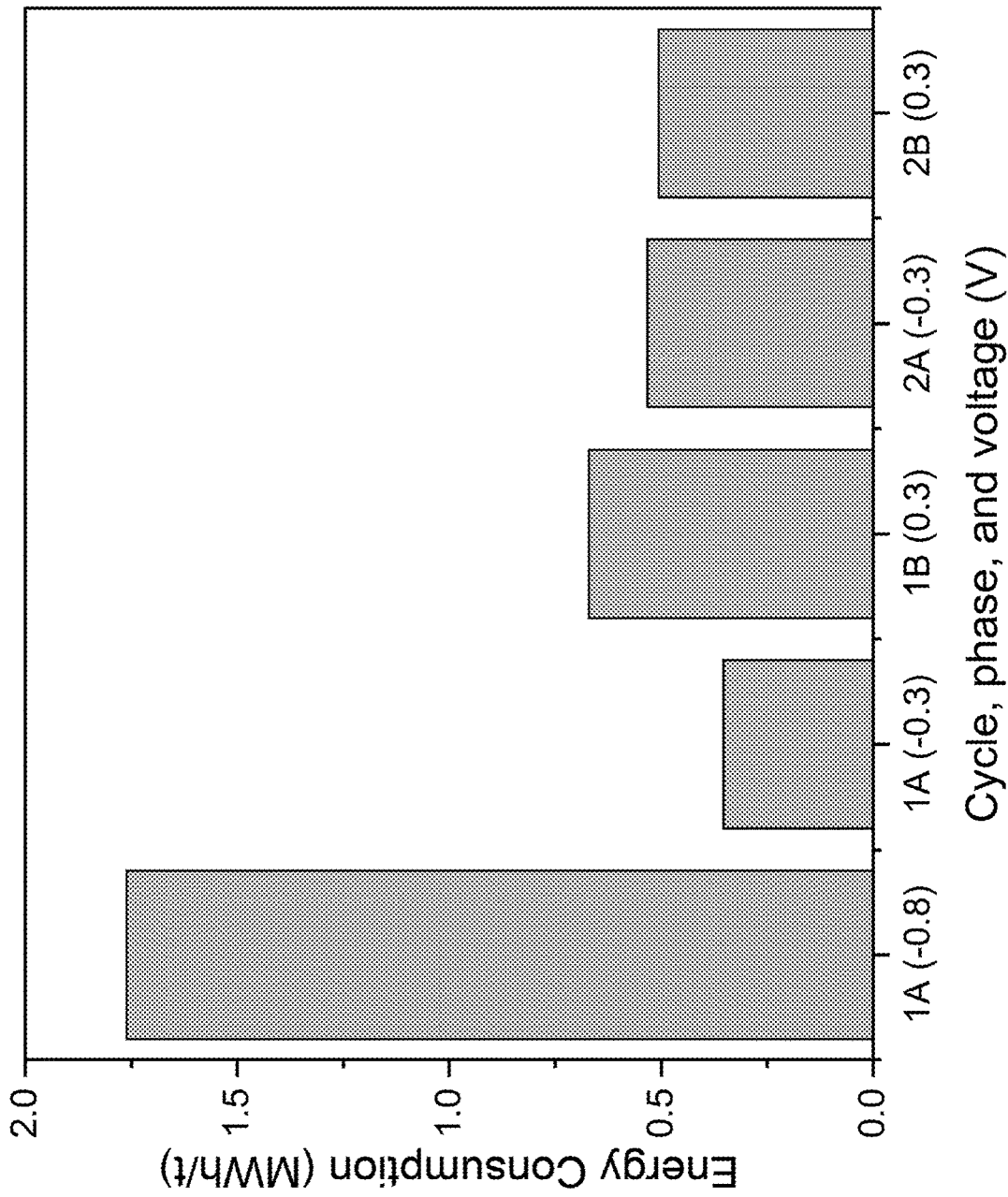
FIG. 11 shows the average energy consumption of the electrochemical cell, neglecting auxiliary equipment, over each cell voltage step for the experiment in Example 1.

In FIG. 11, the energy consumption for the single cell was calculated per tonne of $CO_2$ transported. Averaged over the +/−0.3 V holds, the energy consumption from the electrochemical cell alone (excluding auxiliary equipment) was 0.6 MWh/t.

When introducing elements of the present invention or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the invention are achieved and other advantageous results attained.

As various changes could be made in the above devices and methods without departing from the scope of the invention, it is intended that all matter contained in the above description and shown in the accompanying drawings shall be interpreted as illustrative and not in a limiting sense.

The invention claimed is:

1. An electrochemically-driven carbon dioxide separator (EDCS) for separating carbon dioxide from a carbon dioxide-containing gas, the EDCS comprising:
   a cell, the cell comprising:
      two electrodes that are capable of acting as an anode or a cathode, the two electrodes comprising a charge storage compound and an anion exchange polymer, the charge storage compound being capable of reacting to form hydroxide when acting as the cathode and reacting to consume hydroxide when acting as the anode;
      a membrane adjacent to and separating the two electrodes, the membrane comprising an anion exchange polymer;
      a channel adapted for inflow of a carbon dioxide-containing gas within the membrane;
      a channel adapted for outflow of carbon dioxide and defining an opening in contact with the electrode serving as the anode; and
      a channel adapted for outflow of carbon dioxide and defining an opening in contact with the electrode serving as the cathode;
   wherein the cell is adapted such that in operation:
   the hydroxide produced at the electrode serving as the cathode is transported into the membrane;
   the carbon dioxide-containing gas is contacted with the membrane and the carbon dioxide reacts with the hydroxide ions to form bicarbonate ions, carbonate ions, or bicarbonate and carbonate ions;
   the bicarbonate ions, carbonate ions, or bicarbonate and carbonate ions are transported to the electrode serving as the anode through the membrane;
   the bicarbonate ions, carbonate ions, or bicarbonate and carbonate ions react at the electrode acting as the anode to form carbon dioxide and water; and
   the carbon dioxide is emitted from the EDCS through the channel adapted for outflow of carbon dioxide of the electrode serving as the anode.

2. An electrochemically-driven carbon dioxide separator (EDCS) for separating carbon dioxide from a carbon dioxide-containing gas, the EDCS comprising:
   a cell, the cell comprising:
      two electrodes that are capable of acting as an anode or a cathode, the two electrodes comprising nickel hydroxide optionally in a partially oxidized state and an anion exchange polymer, the nickel hydroxide being capable of reacting to form hydroxide when acting as the cathode and reacting to consume hydroxide when acting as the anode;
      a membrane adjacent to and separating the two electrodes, the membrane comprising an anion exchange polymer;
      a channel adapted for outflow of carbon dioxide or inflow of a carbon dioxide-containing gas and defining an opening in contact with the electrode serving as the anode; and
      a channel adapted for outflow of carbon dioxide or inflow a carbon dioxide-containing gas and defining an opening in contact with the electrode serving as the cathode;
   wherein the cell is adapted such that in operation:
   hydroxide is produced at the electrode serving as the cathode;
   the carbon dioxide-containing gas is contacted with the electrode serving as the cathode and the carbon dioxide reacts with the hydroxide ions to form bicarbonate ions, carbonate ions, or bicarbonate and carbonate ions;
   the bicarbonate ions, carbonate ions, or bicarbonate and carbonate ions are transported to the electrode serving as the anode through the membrane; and
   the bicarbonate ions, carbonate ions, or bicarbonate and carbonate ions react at the electrode acting as the anode to form carbon dioxide and water.

3. The EDCS of claim 1, wherein:
the EDCS further comprises a power supply for supplying a current flow to the electrodes, wherein the power supply is adapted to alternately reverse the direction of current flow, thereby allowing each electrode to act, in turn, as the anode and as the cathode; or
the EDCS further comprises a power supply for supplying a current flow to the electrodes; and an electrical switch coupled to the power supply and the electrodes; wherein the electrical switch is adapted to alternately reverse the direction of current flow, thereby allowing each electrode to act, in turn, as the anode and as the cathode.

4. The EDCS of claim 1, wherein the EDCS further comprises a current collector adjacent to each of the electrodes.

5. The EDCS of claim 1, wherein the charge storage compound comprises a metal hydroxide, a metal oxyhydroxide, a metal oxide, or a hydrogen storage alloy.

6. The EDCS of claim 5, wherein the charge storage compound comprises nickel hydroxide, manganese dioxide, nickel hydroxide in a partially-charged state, or lanthanum nickel hydride.

7. The EDCS of claim 1, wherein the EDCS further comprises an ionomer layer between the membrane and each of the two electrodes that extends along an end of each of the two electrodes to the current collector, the ionomer layer being adapted to seal carbon dioxide released from the electrode serving as the anode within the electrode serving as the anode and the channel for outflow of carbon dioxide from the electrode serving as the anode.

8. The EDCS of claim 7, wherein the ionomer layer comprises an anion exchange polymer.

9. The EDCS of claim 8, wherein;
the anion exchange polymer of the two electrodes, the anion exchange polymer of the membrane and/or the anion exchange membrane of the ionomer layer independently comprise quaternary ammonium or imidazolium groups and a polymer backbone not having ether groups; or
the anion exchange polymer of the two electrodes, the anion exchange polymer of the membrane and/or the anion exchange membrane of the ionomer layer independently comprise poly(aryl piperidinium), alkylammonium-functionalized poly(aryl alkylene), substituted-imidazolium-functionalized poly(aryl alkylene), alkylammonium-functionalized poly(styrene), substituted-imidazolium-functionalized poly(styrene), alkylammonium-functionalized poly(styrene-co-divinylbenzene), substituted-imidazolium-functionalized poly(styrene-co-divinylbenzene), alkylammonium-functionalized poly(styrene-block-ethylene-co-butadiene-block-styrene), substituted-imidazolium-functionalized, poly(styrene-block-ethylene-co-butadiene-block-styrene), alkylammonium-functionalized poly(ethylene), substituted-imidazolium-functionalized poly(ethylene), alkylammonium-functionalized poly(tetrafluoroethylene), substituted-imidazolium-functionalized poly(tetrafluoroethylene), alkylammonium-functionalized poly(ethylene-co-tetrafluoroethylene), substituted-imidazolium-functionalized poly(ethylene-co-tetrafluoroethylene), polyethyleneimine, poly(diallyl ammonium), polydiallyldimethylammonium, or a combination thereof.

10. The EDCS of claim 9, wherein the anion exchange polymer of the two electrodes, the anion exchange polymer of the membrane and/or the anion exchange membrane of the ionomer layer independently comprise poly(aryl piperidinium).

11. The EDCS of claim 9, wherein the anion exchange polymer of the ionomer layer comprises polydiallyldimethylammonium.

12. The EDCS of claim 1, wherein:
the membrane comprises a plurality of the channel for inflow of the carbon dioxide-containing gas within the membrane; or
the membrane comprises void volume for diffusion of the carbon dioxide-containing gas through the membrane; or
the cell further comprises a check valve configured to emit carbon dioxide produced within the electrode serving as the anode from the EDCS through the channel for outflow of carbon dioxide from the electrode serving as the anode.

13. The EDCS of claim 12, wherein the EDCS further comprises a fan for blowing the carbon dioxide-containing gas through the channel for inflow of the carbon dioxide-containing gas within the membrane.

14. The EDCS of claim 1, wherein the carbon dioxide-containing gas is air.

15. The EDCS of claim 1, further comprising a stack comprised of one or more additional cells electrically connected in series; and a manifold adapted for outflow of carbon dioxide from each of the electrodes serving as the anode.

16. The EDCS of claim 15, wherein the ionomer layer surrounds each of the two electrodes and the channels for outflow of carbon dioxide.

17. The EDCS of claim 4, wherein the current collector comprises a bipolar plate between each cell instead of two current collector plates, and a current collector plate at each end of the stack.

18. The EDCS of claim 17, wherein the bipolar plate is configured to provide the channels for outflow of carbon dioxide; or the channels for outflow of carbon dioxide are perpendicular to channels in the membrane for the $CO_2$-containing air.

19. A battery system comprising a metal-air battery and the EDCS of claim 1, wherein the carbon dioxide-containing gas is air and after the air is supplied to the EDCS to reduce the concentration of the carbon dioxide, the air having the reduced concentration of carbon dioxide is directed to a cathode inlet of the metal-air battery.

20. A method for separating carbon dioxide from a carbon dioxide-containing gas comprising supplying the EDCS of claim 1 with the carbon dioxide-containing gas; and driving electrical current through the EDCS.

21. The method of claim 20, wherein the carbon dioxide-containing gas is a flue gas or air.

22. The method of claim 20, wherein the electrical current is driven through the EDCS in a first phase in which one of the two electrodes serves as the anode and the other of the two electrodes serves as the cathode and a second phase in which current is driven so that the one of the two electrodes serves as the cathode and the other of the two electrodes serves as the anode.

23. The method of claim 22, wherein voltage of the EDCS is monitored at a constant current so that each of the first and second phases is continued for a sufficient time to convert most or all of the nickel hydroxide in the anode to nickel oxyhydroxide and to convert most or all of the nickel oxyhydroxide in the cathode to nickel hydroxide before polarity of the cell or cells is reversed.

24. The method of claim 23, wherein the polarity of the cell or cells is reversed when the voltage of the EDCS is in the range of about 0.5 to about 1.0 V per cell.

25. The method of claim 20, further comprising monitoring a ratio of nickel oxyhydroxide to total nickel hydroxide and nickel oxyhydroxide for the two electrodes combined, which when multiplied by 100 indicates a cell-average state of charge (SOC); and triggering an intervention when the ratio reaches a desired threshold value set below 0.5 or the cell-average SOC reaches a desired threshold value below 50%.

26. The method of claim 23, further comprising monitoring a total charge passed in each of the first and second phases; and triggering an intervention when the total charge passed in one of the first and second phases falls below a predetermined fraction of nominal electrode capacity.

27. The method of claim 25, wherein the intervention comprises:

extending the phase of operation until a higher voltage threshold value is reached; or extending the phase of operation until a predetermined amount of charge is passed; or supplying oxygen or air to the cathode to facilitate an oxygen reduction reaction; or applying current to the EDCS to facilitate a hydrogen evolution reaction.

28. The method of claim 27, wherein the intervention comprises extending the phase of operation until the higher voltage threshold value is reached, and the higher voltage threshold is in the range of about 1.0 to about 2.0 V per cell; or the intervention comprises extending the phase of operation until the predetermined amount of charge is passed, and the predetermined amount of charge ranges from about 80% to about 120% of nominal electrode capacity.

* * * * *